(12) United States Patent
Saikin et al.

(10) Patent No.: US 10,744,696 B2
(45) Date of Patent: Aug. 18, 2020

(54) REINFORCED CORELESS TUBE EXTRUSION SYSTEMS AND METHODS

(71) Applicant: W. L. Gore & Associates, Inc., Newark, DE (US)

(72) Inventors: Alan H. Saikin, Jackson, NJ (US); Lue H. Li, Hamilton, NJ (US); Gary J. Mizenko, Point Pleasant, NJ (US)

(73) Assignee: Fermatex Vascular Technologies, LLC, Los Angeles, CA (US)

( * ) Notice: Subject to any disclaimer, the term of this patent is extended or adjusted under 35 U.S.C. 154(b) by 410 days.

(21) Appl. No.: 15/435,450

(22) Filed: Feb. 17, 2017

(65) Prior Publication Data

US 2018/0236703 A1 Aug. 23, 2018

(51) Int. Cl.
*B29C 48/14* (2019.01)
*F16L 11/08* (2006.01)
(Continued)

(52) U.S. Cl.
CPC .............. *B29C 48/14* (2019.02); *B05D 7/222* (2013.01); *B29C 48/03* (2019.02); *B29C 48/09* (2019.02); *B29C 48/143* (2019.02); *B29C 48/146* (2019.02); *B29C 48/151* (2019.02); *B29C 48/2883* (2019.02); *B29C 48/30* (2019.02); *B29C 48/34* (2019.02); *B29C 48/355* (2019.02); *B29D 23/00* (2013.01); *B29D 23/18* (2013.01);
(Continued)

(58) Field of Classification Search
CPC .... B05D 7/222; B05D 2254/02; B29C 48/14; B29C 48/34; B29C 48/355; B29C 48/2883; B29C 48/30; B29C 48/143; B29C 48/03; B29C 48/151; B29C 48/146; B29C 48/09; B29C 2791/006; F16L 11/087; B29D 23/00; B29D 23/18
See application file for complete search history.

(56) References Cited

U.S. PATENT DOCUMENTS 2,763,316 A * 9/1956 Stahl .................. B29C 48/09
156/149
3,018,755 A * 1/1962 Metcalf .................. B29C 48/15
118/125
(Continued)

FOREIGN PATENT DOCUMENTS

CA 1209493 8/1986
EP 0157956 A1 * 10/1985 ........... B29C 35/025
(Continued)

OTHER PUBLICATIONS

International Search Report and Written Opinion issued in PCT/US2018/015703, dated Jul. 9, 2018, 19 pages.

*Primary Examiner* — William P Fletcher, III
(74) *Attorney, Agent, or Firm* — Faegre Drinker Biddle & Reath, LLP

(57) ABSTRACT

Methods of coating a base tube are disclosed. Various methods include passing a hollow base tube into a coating die while maintaining a chamber pressure outside the hollow base tube that is lower than a pressure within an inner lumen of the hollow base tube. Such methods can include extruding coating material onto the hollow base tube to form a coated hollow tube by delivering coating material into the coating die. Vacuum may be formed within the coating die proximate a point of impingement where the coating material is applied to the hollow base tube.

18 Claims, 12 Drawing Sheets

(51) Int. Cl.
| | |
|---|---|
| *B29C 48/09* | (2019.01) |
| *B29C 48/151* | (2019.01) |
| *B29C 48/03* | (2019.01) |
| *B29C 48/30* | (2019.01) |
| *B29C 48/285* | (2019.01) |
| *B29C 48/355* | (2019.01) |
| *B29C 48/34* | (2019.01) |
| *B05D 7/22* | (2006.01) |
| *B29D 23/18* | (2006.01) |
| *B29D 23/00* | (2006.01) |

(52) U.S. Cl.
CPC ........ *F16L 11/087* (2013.01); *B05D 2254/02* (2013.01); *B29C 2791/006* (2013.01)

(56) References Cited

U.S. PATENT DOCUMENTS

| | | |
|---|---|---|
| 3,116,760 A | 1/1964 | Matthews |
| 3,543,805 A | 12/1970 | Matthews et al. |
| 3,737,261 A | 6/1973 | Hardesty |
| 3,832,270 A | 8/1974 | Schirmer |
| 3,946,097 A | 3/1976 | Takahashi et al. |
| 4,041,198 A | 8/1977 | McPherson |
| 4,155,790 A | 5/1979 | Gallloway |
| 4,205,034 A | 5/1980 | Newberry |
| 4,385,018 A | 5/1983 | Kutnyak |
| 4,671,761 A | 6/1987 | Adrian et al. |
| 4,859,380 A | 8/1989 | Ogata |
| 5,094,798 A | 3/1992 | Hewitt |
| 5,156,699 A | 10/1992 | Nakano et al. |
| 5,912,023 A | 6/1999 | Katoh et al. |
| 7,988,438 B2 | 8/2011 | Sutton et al. |

FOREIGN PATENT DOCUMENTS

| | | |
|---|---|---|
| EP | 2413010 A1 | 2/2012 |
| GB | 2142270 A | 1/1985 |
| WO | 2016097823 A1 | 6/2016 |
| ZA | 9302279 B | * 10/1993 |

* cited by examiner

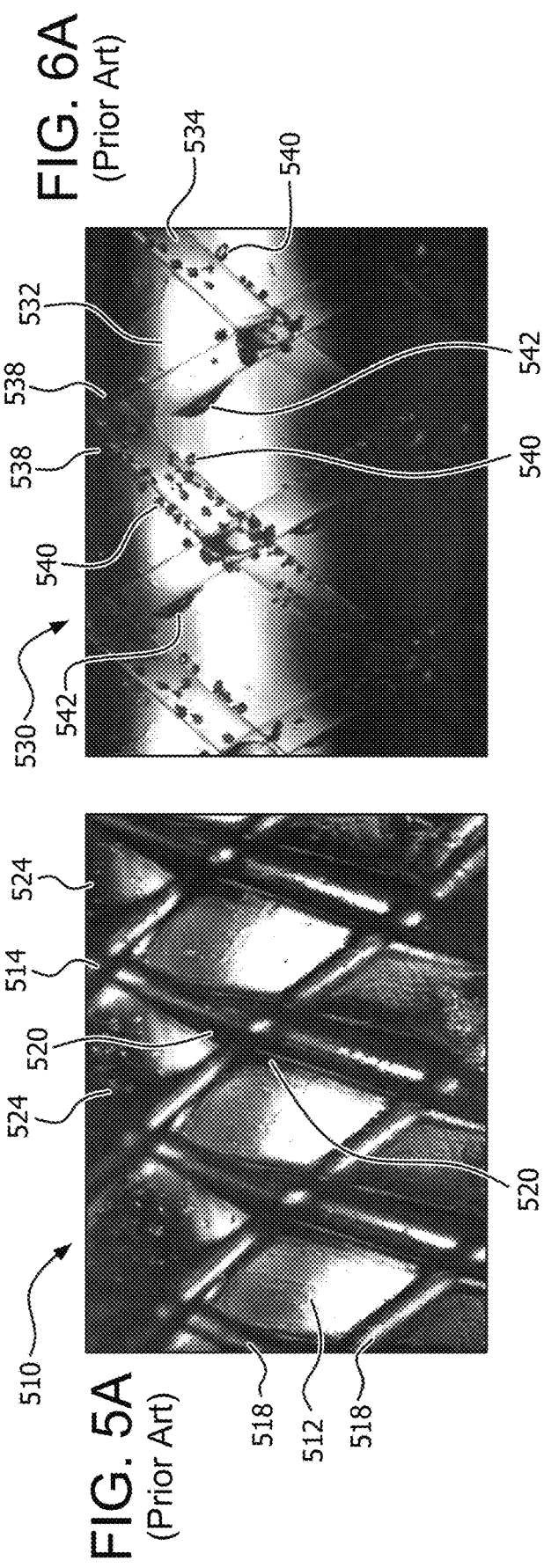
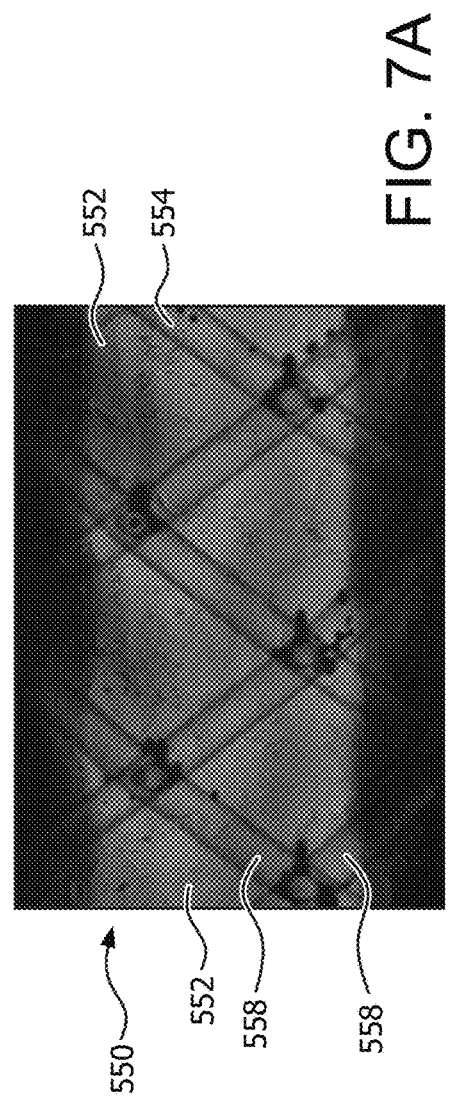

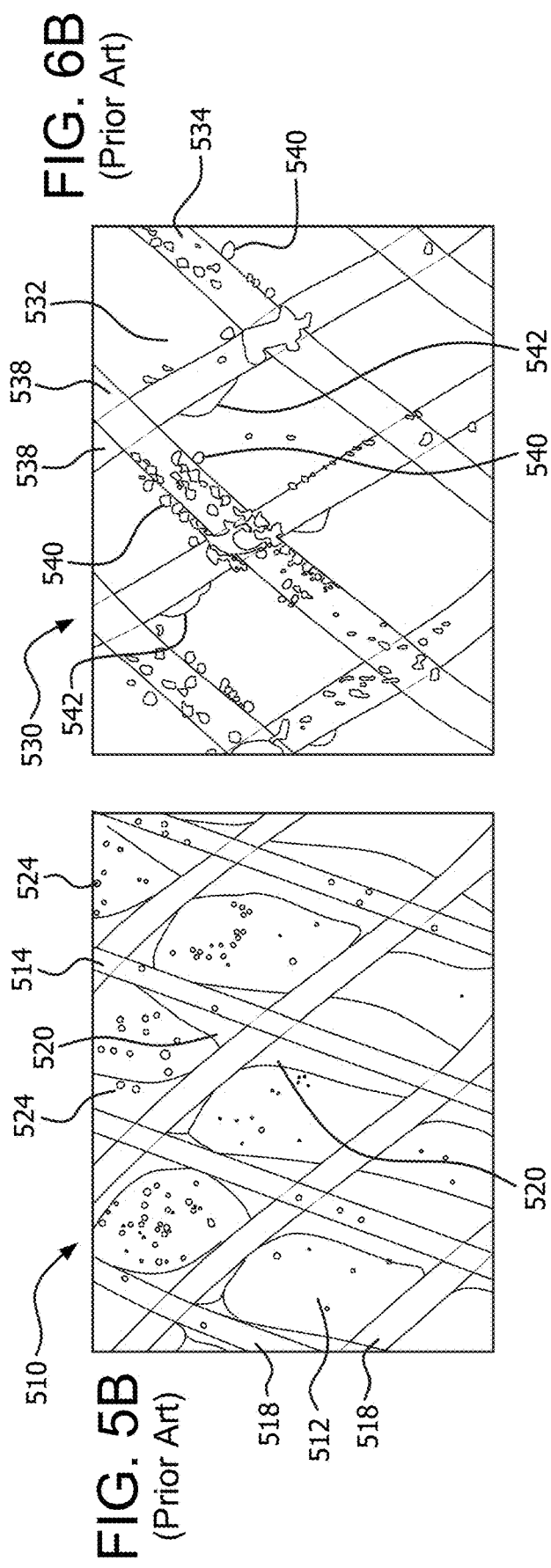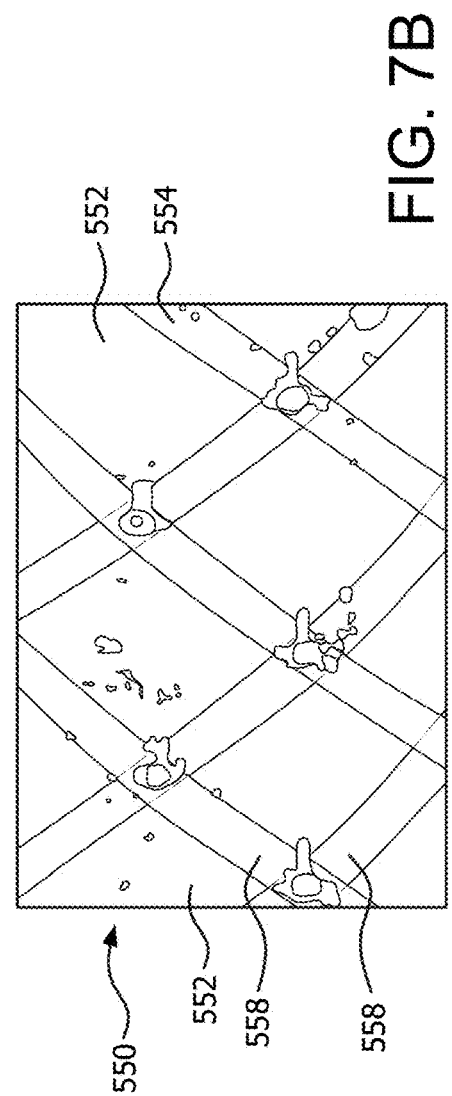

REINFORCED CORELESS TUBE EXTRUSION SYSTEMS AND METHODS

FIELD

The present disclosure relates to extrusion technology. More particularly, the present disclosure relates to extrusion systems and methods for coating base tubes or other articles.

BACKGROUND

Extrusion coating processes may be used to coat molten material on a base tube using an extruder with a die. For example, extrusion coating may be used to coat a plastic material on the surface of a base tube to form an outer layer or jacket on the base tube. When forming hollow coated tubes, a hollow base tube is often provided with a reinforcing core that provides support to the hollow base tube during the extrusion process and which can be subsequently removed from the coated hollow tube. For example, the high pressures and temperatures used in a coating process can render base tubes, and especially hollow base tubes, more susceptible to undesirable collapsing and stretching under processing conditions. Generally, coated tubes benefit from a good bonding of the coated, or extruded layer to the base tube. The reinforcing core is intended to facilitate good bonding by reducing the occurrence of undesirable stretching and/or base tube collapse, for example.

SUMMARY

Various aspects of the present disclosure relate to a method of coating a base tube (e.g., a hollow base tube without the use of a reinforcing core within the hollow base tube) during the coating process. In some examples, the method includes passing a hollow base tube into a coating die while maintaining a chamber pressure outside the hollow base tube that is lower than a pressure within an inner lumen of the hollow base tube. The method includes extruding coating material onto the hollow base tube using the coating die to form a coated hollow tube by delivering coating material into the coating die. A vacuum is maintained within the coating die proximate a point of impingement where the coating material is applied to the hollow base tube. The coating material can be delivered into the coating die by virtue of the negative pressure within the die (e.g., the material is "drawn" into the coating die by a pressure differential exhibited in a portion of the die), by applying an external positive pressure to the coating material (e.g., the material is "pushed" into the coating die by a pressure differential exhibited in a portion of the die), or a combination thereof. The method may include passing the hollow base tube through a first vacuum chamber, wherein the first vacuum chamber is configured to maintain a first negative pressure within the first vacuum chamber that is lower than a pressure outside the first vacuum chamber. The method includes passing the hollow tube through a second vacuum chamber that is downstream from the first vacuum chamber. The second vacuum chamber is configured to maintain a second pressure within the second vacuum chamber that is lower than the first pressure; the coating die is in fluid communication with the second vacuum chamber. In various forms, aspects of the present disclosure relate to a method for coating a hollow base tube that is characterized by reduced particulation (e.g., the method produces a hollow base tube having a lower number of particles formed on the inner surface of the coated hollow tube without including a separate step for cleaning the hollow base tube following manufacture).

Various aspects of the present disclosure relate to a system for coating a base tube (e.g., a hollow base tube without a reinforcing core within the hollow base tube). The system may comprise a coating die configured to apply a coating material to a hollow base tube and maintain a chamber pressure outside the hollow base tube that is lower than an internal positive pressure within an inner lumen of the hollow base tube. The system may include an extrusion apparatus configured to continuously extrude the coating material into the coating die. The system may include a vacuum source in fluid communication with the coating die and configured to form a vacuum within the coating die at a point of impingement where the coating material is applied to the hollow base tube.

Various aspects of the present disclosure relate to a coated tube (e.g., a hollow coated tube) comprising a base tube (e.g., a hollow base tube) including a braided reinforcing layer surrounding a continuous inner layer. In some examples, a hollow base tube to be coated has an outer surface, an inner surface, and an inner lumen defined by the inner surface; and a coating layer may be extruded on the outer surface of the hollow base tube. In various forms, a coated hollow tube corresponding to the hollow base tube is substantially free of particles on the inner surface of the coated hollow tube (e.g., immediately following manufacture without including a separate step for removing particles from the inner surface of the hollow base tube). In various forms, as a result of the forming process, the coated hollow tube has enhanced bonding/lamination between the coated (extruded) layer(s) and the underlying, hollow tube compared to coated hollow tubes formed from previously available processes. In various examples, the resulting, coated hollow tube is substantially free of voids between the hollow base tube and the coating layer and the inner lumen of the hollow tube has a relatively smooth finish (e.g., as compared to a matte finish having a rough or granular surface). In addition or as an alternative to the enhanced bonding achieved by reducing or substantially removing the presence of voids between the hollow base tube and the coating layer, the final coated tube has enhanced clarity and light transmission qualities, for example.

In various examples, systems, methods and devices according to the instant disclosure facilitate coating, or extruding a coating onto a hollow base tube without using a reinforcing core. Advantages of such systems, methods, and devices include avoidance of causing damage to the inner surface of the coated tube during removal of the reinforcing core (e.g. which can form a surface having an unsuitable roughness, generate particulate matter, add a processing step, and/or have other undesirable effects). In instances where reinforcing cores have a relatively short, fixed lengths to facilitate removal, advantages include the ability to continuously coat longer lengths of base tube without cutting or otherwise interrupting processing to remove reinforcing cores. Thus, various aspects of the instant disclosure address embodiments that facilitate processes for coating hollow base tubes that do not require use of reinforcing cores that are to be subsequently removed, which facilitate greater lengths of hollow tube to be coated at a time without additional processing steps, as well as other additional or alternative advantages.

While multiple embodiments of inventive concepts are provided by the instant disclosure, still other examples will become apparent to those skilled in the art from the following detailed description, which shows and describes various illustrative examples. Accordingly, the drawings and detailed description are to be as illustrative in nature and not restrictive.

BRIEF DESCRIPTION OF THE DRAWINGS

FIG. 5A is a photograph of a comparative example of a coated hollow tube, in accordance with the prior art methods.

FIG. 5B is a line drawing of the features of the coated hollow tube shown in FIG. 5A.

FIG. 6A is a photograph of a comparative example of a coated hollow tube, in accordance with the prior art methods.

FIG. 6B is a line drawing of the features of the coated hollow tube shown in FIG. 6A.

FIG. 7A is a photograph of a coated hollow tube, according to various examples.

FIG. 7B is a line drawing of the features of the coated hollow tube shown in FIG. 7A.

DETAILED DESCRIPTION

Various aspects of the present disclosure are directed to apparatuses, systems, and methods for coating a hollow base tube. As described further below, the hollow base tube may include a reinforcing layer, and may be coated without a reinforcing core within the hollow base tube during a coating process. The hollow base tube may be continuously coated without stretching of the hollow base tube. The hollow base tube may be continuously coated and substantially free of air entrapment between the hollow base tube and the coating layer. Various aspects of the present disclosure are directed to coated hollow tubes, along with associated methods and systems for forming such tubes having increased bond strength between layers of the coated hollow tube, reduced number of voids between coated hollow tube layers, reduced particulate generation, reduced light obscuration, and/or reduced inner surface roughness than a hollow base tube as compared to those made with a comparative process, although a variety of additional or alternative advantages and features are contemplated. For example, although various examples are described in which a hollow base tube is processed without the presence of a reinforcing core, it should be appreciated that the instant methods and systems may be applied in a process that includes a reinforcing core within the base tube if desired.

Figure 1A:
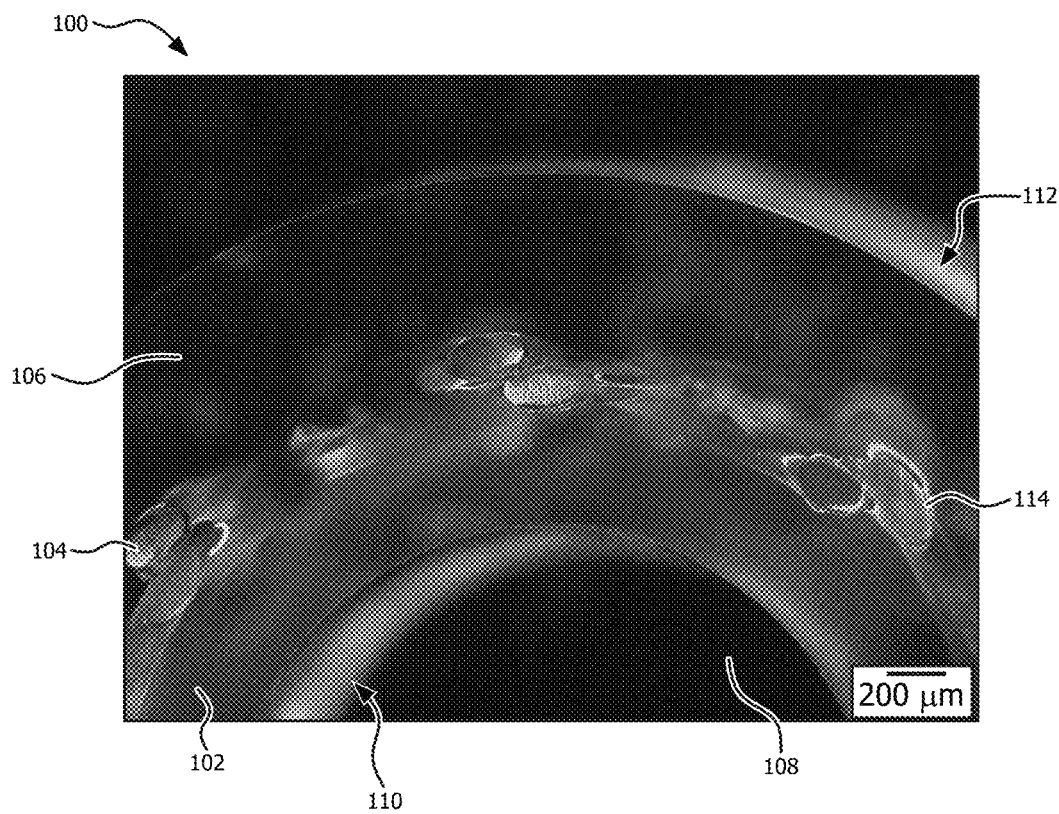
FIG. 1A is a photograph of a cross-sectional view of a coated hollow tube, according to various examples.
Figure 1B:
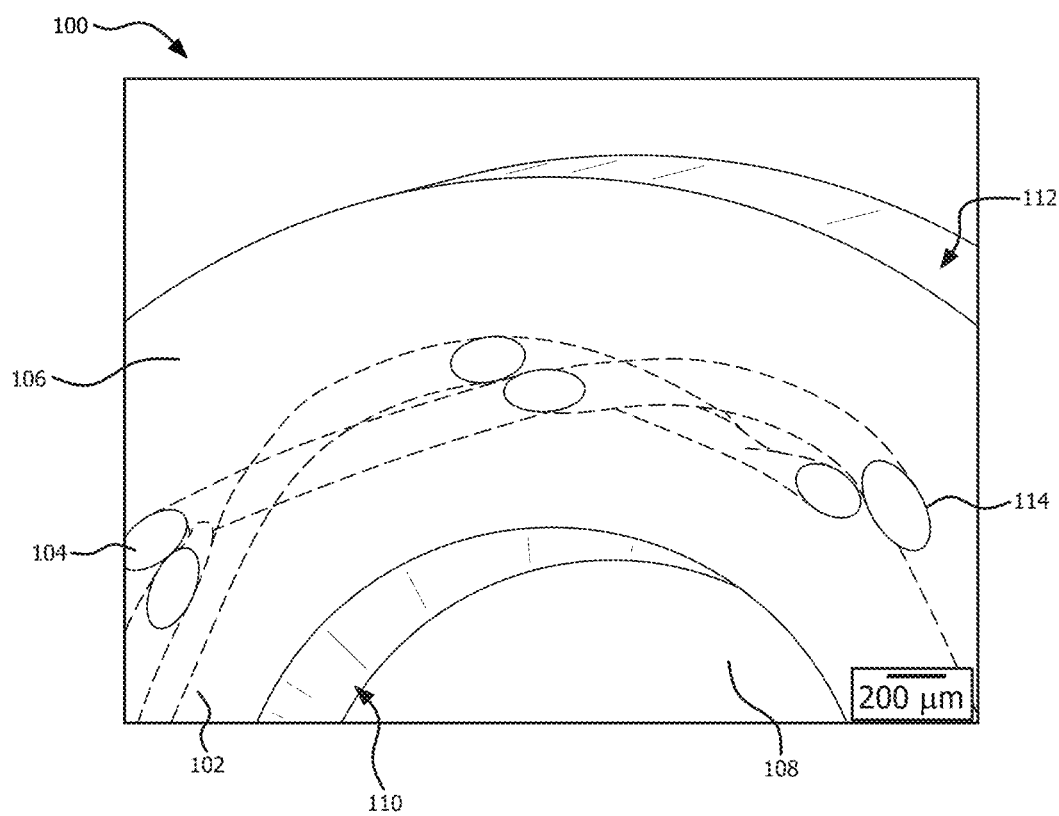
FIG. 1B is a line drawing of the features of the coated hollow tube shown in FIG. 1A, according to various examples.

FIGS. 1A and 1B are cross-sectional views of a coated hollow tube 100 according to various examples of the present disclosure. As shown in FIGS. 1A and 1B, the coated hollow tube 100 includes an inner layer 102, a reinforcing layer 104, and an outer layer 106. The inner layer 102 defines an inner surface 110 that is substantially smooth in some examples, although relatively rough inner surfaces are also contemplated. For example, the inner surface 110 can have a predetermined roughness that is present without removing a reinforcing core. The inner layer 102 may be an inner tube having the inner surface 110 that defines an inner lumen 108 within the coated hollow tube 100. The outer layer 106 defines an outer surface 112 of the coated hollow tube 100. As shown in FIGS. 1A and 1B, the reinforcing layer 104 lies generally between the inner layer 102 and the outer layer 106. As also shown in FIGS. 1A and 1B, an interface 114 may be located where the outer layer 106 meets the reinforcing layer 104 and/or the inner layer 102.

Figure 2:
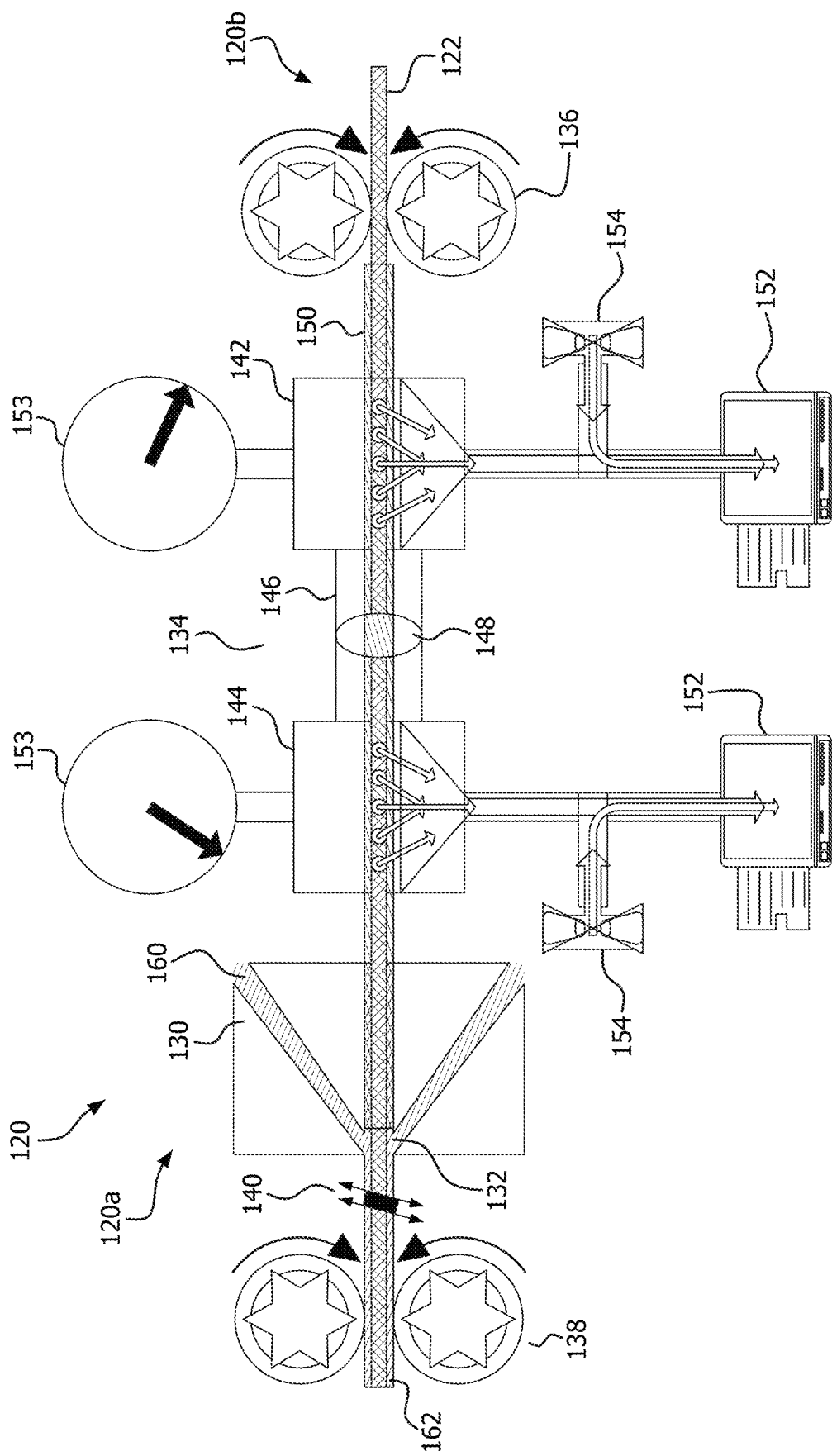
FIG. 2 is a schematic of a system for extrusion coating a hollow base tube, according to various examples.

FIG. 2 is an overall schematic of a system 120 that may be used to coat a hollow base tube 122, in accordance with some embodiments. The system 120 includes a coating system 120a (shown in greater detail in FIG. 3) and a tension system 120b (shown in greater detail in FIG. 4). In some examples, the system 120 may be used to coat the hollow base tube 122 without a reinforcing core within the hollow base tube 122. The hollow base tube 122 optionally defines a continuous length of material (e.g. the hollow base tube 122 has a length great enough to be wound on a spool rather than provided in short sections) and the system 120 may be used to continuously coat the hollow base tube 122 that is provided as a continuous length of material.

As shown in FIG. 2, the system 120 includes an extruder 130, a die 132, and a vacuum source 134. In some examples, the system 120 includes a feed drive 136, a pull drive 138, a quench tank 140, and a pressure tube 150. Typically, the direction of travel of the hollow base tube 122 through the system 120 is from the feed drive 136, to the vacuum source 134, through the die 132, through the quench tank 140, and then to the pull drive 138. In some examples, the pressure tube 150 extends through the vacuum source 134 and through at least portion of the die 132.

In general, the hollow base tube 122 may be provided as a continuous unitary length, although separate, connected components are also contemplated. For example, the hollow base tube 122 can be continuously introduced into the system 120 as part of a continuous coating/extruding operation. As shown, the hollow base tube 122 passes inside the pressure tube 150 into the vacuum source 134 and through the die 132. The extruder 130 extrudes molten coating material 160 and provides the molten coating material to the die 132. The die 132 directs molten coating material 160 around the hollow base tube 122 to form a coating on the hollow base tube 122. After coating, the hollow base tube 122 may pass through the quench tank 140 where the molten coating material 160 is cooled and solidified around the hollow base tube 122, forming a coated hollow tube 162. After the molten coating material 160 has solidified, the coated hollow tube 162 may be drawn from the quench tank 140 and exit the system 120. This is described further below.

In some examples, the vacuum source 134 includes a first vacuum chamber 142 and a second vacuum chamber 144. In some implementations, the first vacuum chamber 142 is in fluid communication with the second vacuum chamber 144. For example, a conduit 146 may be positioned between the first vacuum chamber 142 and the second vacuum chamber 144. A chamber seal 148 may be positioned within the conduit 146 and regulate a flow of gas, such as air, within the conduit 146 between the first vacuum chamber 142 and the second vacuum chamber 144. The system 120 may include one or more pumps 152, one or more pressure gauges 153, and a vacuum control 154 for controlling a pressure inside the vacuum source 134 (e.g. the vacuum control 154 may include a valve for modulating air drawn from the vacuum source 134 by pumps 152.)

Figure 3:
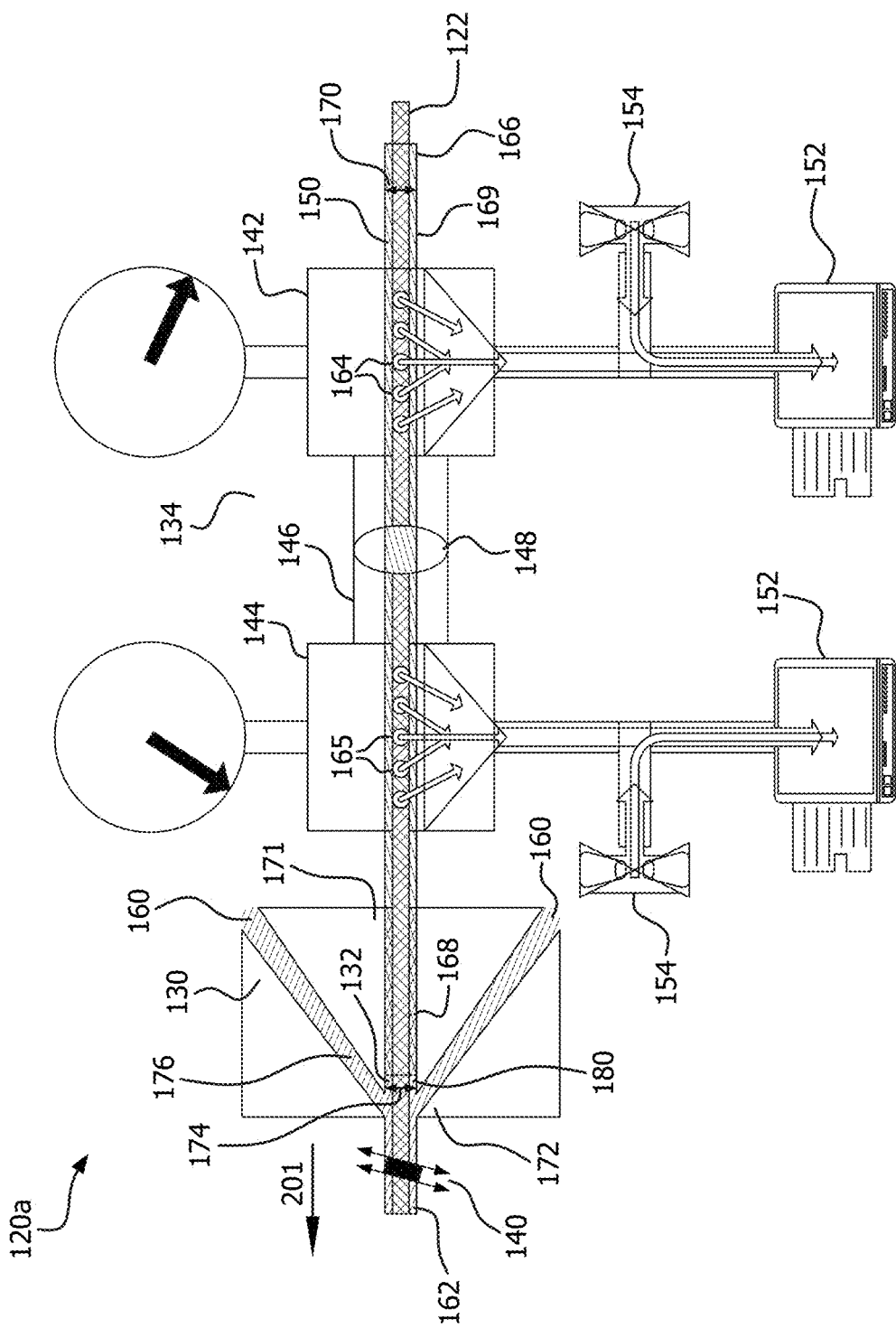
FIG. 3 is a schematic of a coating system for extrusion coating a hollow base tube, according to various examples.

FIG. 3 is a schematic view of coating system 120a in accordance with various embodiments. The coating system 120a is shown with portions of the system 120 of FIG. 2 removed for ease of illustration. As shown in FIG. 3, the coating system 120a includes the extruder 130, the die 132, the vacuum source 134, and the pressure tube 150. The arrow 201 shows the direction of travel through the coating system 120a. In general, a hollow base tube 122 enters the coating system 120a where a coating is applied and then a coated hollow tube 162 exits the coating system 120a.

The vacuum source 134 may be configured to maintain a pressure inside the vacuum source 134 that is lower than a pressure outside the vacuum source 134 during operation of the coating system 120a. For example, the vacuum source 134 optionally maintains a negative pressure, or an absolute pressure that is less than ambient and/or atmospheric pressure. The vacuum source 134 is connected to one or more pumps 152 that regulate a pressure within the vacuum source 134, such as by removing air from within the vacuum source 134. The outside of the vacuum source 134 may be open to an ambient pressure such as atmospheric pressure. The pumps 152 may remove air from within the vacuum source 134 and maintain a pressure inside the vacuum source 134 that is lower than the pressure outside of the vacuum source 134, (e.g., below an ambient pressure such as atmospheric pressure.) The vacuum control 154 may control the pressure within the vacuum source 134. For example, the vacuum control 154 may include a valve that controls a flow of air into the pumps 152 from outside the vacuum source 134. In some configurations, the pumps 152 are controlled to continuously pump air out of the vacuum source 134, and the vacuum control 154 modulates the flow rate of the air drawn out of the vacuum source 134 by opening a valve that allows a portion of the air drawn by the pumps 152 to be air drawn from outside the vacuum source 134, also referred to as make-up air.

In some examples, the vacuum source 134 includes the first vacuum chamber 142 and the second vacuum chamber 144. The first and second vacuum chambers 142, 144 may be connected by a conduit 146. The vacuum source 134 includes a chamber seal 148 within the conduit 146 between the first and second vacuum chambers 142, 144. Air flow between the first and second vacuum chambers 142, 144 can be controlled using the chamber seal 148. For example, the chamber seal 148 is operable between an open configuration and a closed configuration to allow or inhibit air flow between the first and second vacuum chambers 142, 144. The chamber seal 148 may be a flange positioned around the pressure tube 150 and inside the conduit 146. For example, the chamber seal 148 may be a flange formed of a solid material such as metal or rubber. The chamber seal 148 may be operable to allow air flow between the first and second vacuum chambers 142, 144, for example, to equalize a pressure in the first and second vacuum chambers 142, 144.

The first vacuum chamber 142 may be controlled at a first pressure (e.g. first vacuum pressure), and the second vacuum chamber 144 may be controlled at a second pressure (e.g. second vacuum pressure) that is different than the first pressure. Using more than one vacuum chamber in series may achieve a greater vacuum (i.e. a lower pressure) inside the vacuum source 134 than using only a single vacuum chamber. For example, a gap or an incomplete seal between the outer diameter of the hollow base tube 122 and the inner diameter 170 of the first end 166 of the pressure tube 150 may limit the level of vacuum that can be attained because of air flow into vacuum source 134 through pressure tube 150. Inhibiting flow between the first and second vacuum chambers 142, 144 allows the first vacuum chamber 142 to maintain a first vacuum pressure, which isolates the second vacuum chamber 144 from an ambient pressure such that the second vacuum chamber 144 can achieve greater vacuum (i.e. a lower pressure). Using more than one vacuum chamber in series allows a greater pressure difference to be formed between the second vacuum pressure and the pressure outside the vacuum source 134, even with an incomplete seal at the pressure tube first end 166. That is, the first vacuum chamber 142 isolates the second vacuum chamber 144 from a pressure outside the vacuum source 134. In still further examples, a third, fourth, fifth, etc. vacuum chamber is used in series with the first and second vacuum chambers 142, 144 to achieve a desired pressure and/or to facilitate fine tuning of the pressure experienced in the die 132. In some instances, the vacuum source 134 having more than one vacuum chamber in series helps prevent pressure fluctuations such as pressure oscillations within the vacuum source 134 and/or the die 132. For example, having vacuum source 134 with two or more vacuum chambers inhibits loss of vacuum within vacuum source 134 and dampens pressure changes from a control system responding to a loss of vacuum. That is, having vacuum source 134 having two or more vacuum chambers may help provide a more stable chamber pressure within the die 132 than a vacuum source 134 having a single vacuum chamber.

In some examples, the first vacuum chamber 142 provides an alternative to a solid seal at the first end 166 of the pressure tube 150 to isolate the second vacuum chamber 144 from a pressure outside the vacuum source 134. Generally, a solid seal may be used within the inner diameter 170 of the first end 166 of the pressure tube 150 to inhibit flow of fluid, such as air, and help prevent loss of vacuum within the vacuum source 134. This may be the case for a system having only a single vacuum chamber. In some instances, a solid seal may not be suitable, for example, when coating a hollow base tube 122 with a varying outer diameter or texture along sections of hollow base tube 122. For example, the hollow base tube 122 may have a textured outer surface, such as a textured surface formed by strands of a reinforcing material that are braided, coiled, spiral wound, or helically patterned to form a reinforcing layer. The outer diameter of the hollow base tube 122 may be different between locations where a strand is located and locations between strands. If a solid seal is in contact with the textured outer surface of the hollow base tube 122, the textured outer surface may abrade the solid seal as the hollow base tube 122 is fed into the pressure tube 150 or simply be more difficult to seal with a solid seal due to the irregularities. Abrasion may erode the solid seal, leading to an insufficient barrier at the first end 166, and lead to loss of vacuum within the vacuum source 134. Using a solid seal, such as a bladder made of rubber or plastic, may also lead to additional undesirable results, such as damage to the outer surface of the hollow base tube 122, unwanted debris, or other considerations. The solid seal may also wear out and require replacement, which may lead to downtime, i.e. the coating system 120a may have to be turned off while the seal is replaced. Using the first vacuum chamber 142 to isolate the second vacuum chamber 144 from the ambient pressure facilitates achieving a suitable pressure within the second vacuum chamber 144 without a solid seal in contact with the hollow base tube 122.

As used herein, a vacuum refers to a pressure that is lower than an ambient pressure, e.g. atmospheric pressure (about 29.92 inches mercury (in. Hg)). In some examples, the first vacuum may be a pressure of about 29 in. Hg, 20 in. Hg, or about 15 in. Hg or may be a pressure of about 10 in. Hg, 5.0 in. Hg, or about 1.0 in. Hg (about 736.6, 508.0, or 381.0 Torr, or about 254.0, 127.0, or 25.4 Torr) or a pressure between any pair of the foregoing values, for example, although additional values are also contemplated. In some examples, the second vacuum may be a pressure of about 29 in. Hg, 20 in. Hg, or 15 in. Hg, or may be a pressure of about 10 in. Hg, 5.0 in. Hg, or 1.0 in. Hg (about 736.6, 508.0, or 381.0 Torr, or about 254.0, 127.0, or 12.7 Torr) or a pressure between any pair of the foregoing values, for example, although additional values are also contemplated. Vacuum can be described in units of absolute pressure, or relative pressure (negative relative pressure) as desired.

In some examples, the vacuum source 134 is controlled at a pressure that is lower than an internal pressure inside the hollow base tube 122. For example, the hollow base tube 122 may have an open lumen inside the hollow base tube 122 and the open lumen may have a lumen pressure. If the lumen pressure inside the hollow base tube 122 is higher than the pressure inside the vacuum source 134, the inside of the hollow base tube 122 has a positive pressure within the lumen. A positive pressure within the lumen of the hollow base tube 122 imparts radial strength to the hollow base tube 122. The pressure inside the vacuum source 134 may be controlled to produce a suitable pressure difference with the lumen and provide suitable radial strength inside hollow base tube 122. A suitable radial strength may be controlled, such as for a hollow base tube 122 having particular wall thickness or formed from material having a known strength and/or durometer. A suitable radial strength is high enough to withstand inward radial pressure such that the hollow base tube 122 remains expanded during a coating process and does not collapse or stretch, but is also balanced with the wall strength of the hollow base tube 122 to help prevent over expansion and/or breakage. The suitable radial strength may be controlled by controlling the pressure inside the vacuum source 134 and die 132, for example by controlling the pumps 152, the pressure gauges 153, and/or the vacuum control 154.

As shown in FIG. 3, the pressure tube 150 has a first end 166, a second end 168, and a wall 169 defining an inner diameter 170. The first end 166 is positioned outside the vacuum source 134 and the second end 168 can be positioned inside the die 132. The pressure tube 150 may have openings through the wall 169 at suitable locations. For example, the pressure tube 150 may have first openings 164 and second openings 165. The first openings 164 are located along a section of the wall 169 positioned within the first vacuum chamber 142 and provide a fluid connection between the inside of the pressure tube 150 and the first vacuum chamber 142. The second openings 165 are located along a section of the wall 169 positioned within the second vacuum chamber 144 and provide a fluid connection between the inside of the pressure tube 150 and the second vacuum chamber 144. The first vacuum chamber 142 may provide a first vacuum within the pressure tube 150 proximate the first end 166 and the second vacuum chamber 144 may provide a second vacuum within the pressure tube 150 proximate the second end 168. That is, the inside of the pressure tube 150 may have a greater vacuum along the second end 168 than along the first end 166. In some examples, the pressure tube 150 provides the only direct fluid connection between the inside of the first vacuum chamber 142 and the inside of the second vacuum chamber 144. That is, the chamber seal 148 within the conduit 146 may be closed, such that the pressure tube 150 provides the only fluid connection between the first and second vacuum chamber 142, 144 through the first and second openings 164, 165.

In some examples, the pressure tube 150 encloses the hollow base tube 122 and controls a pressure and/or temperature around the hollow base tube 122 at various locations inside the extruder 130, the die 132, and the vacuum source 134. Vacuum inside the pressure tube 150 is controlled by the vacuum source 134 to provide a suitable radial strength from the positive pressure inside the hollow base tube 122. The pressure tube 150 may be used to provide a controllable atmosphere around the hollow base tube 122 that is different than an atmosphere outside the system 200. For example, a suitable chamber pressure may be achieved inside the pressure tube 150 near the second end 168 by drawing gas such as air out of the pressure tube 150 using the first and second vacuum chambers 142, 144.

In some examples, the pressure tube 150 has an inner diameter 170 that is sized to correspond to an outer diameter of the hollow base tube 122. For example, the inner diameter 170 of the pressure tube 150 may be sized with a substantially similar diameter as the outer diameter of the hollow base tube 122 such that a gap between the outer diameter of the hollow base tube 122 and the inner diameter 170 of the pressure tube 150 is reduced. Reducing the size of a gap between the outer diameter of the hollow base tube 122 and the inner diameter 170 of the first end 166 may inhibit air flow into the vacuum source 134 from outside of the coating system 120a through the pressure tube 150. In some examples, the pressure tube 150 may be positioned to guide the hollow base tube 122 into the die 132 and past the extruder head 176.

As shown in FIG. 3, the extruder 130 is connected to the die 132. The extruder 130 may have an extruder head 176 that is directly connected to the inside of the die 132 without a gap between the extruder 130 and the die 132. That is, the extruder 130 may be attached to the die 132 and have a direct fluid connection to the inside of the die 132 free of openings to an atmosphere outside of the coating system 120a. Molten coating material 160 may be provided by the extruder 130 at a suitable temperature and directed though the extruder head 176 into the die 132. The extruder 130 may be used to drive molten coating material 160 into the die 132 at a suitable volumetric flow rate. The extruder 130 may be controlled to provide molten coating material 160 at a volumetric flow rate defined by the following parameters: desired coating thickness, the diameter of hollow base tube 122, and the speed of the hollow base tube 122 through the die 132. The extruder head 176 may be shaped to provide a layer of molten coating material 160 to the entire circumference of the hollow base tube 122 as it passes through the die 132. The extruder 130 may include more than one extruder head 176 around a circumference of die 132.

As shown in FIG. 3, the die 132 may have a first end 171, a second end 172, and an inner diameter 174. The first end 171 of the die 132 may receive the pressure tube 150, and the second end of the die 132 may be connected to the extruder head 176. The inner diameter 174 of the die 132 is larger than an outer diameter of the hollow base tube 122. That is a gap or space is defined between the outer diameter of the hollow base tube 122 and the inner diameter 174 of the die 132. The die 132 coats the molten coating material 160 onto the outside of the hollow base tube 122. The inner diameter 174 of the die 132 may be sized and/or shaped to produce a coated hollow tube 162 having a suitable coating thickness.

As shown in FIG. 3, the inside of die 132 is directly connected to the extruder head 176 and is configured to direct molten coating material 160 to the outer circumference of the hollow base tube 122. The extruder 130 may be controlled to provide molten coating material 160 at a suitable volumetric flow rate to maintain a standing flow of molten coating material 160 in the gap or space between the hollow base tube 122 and the inner diameter 174 of the die 132, and around the entire outer circumference of the hollow base tube 122. The hollow base tube 122 that is coated with molten coating material 160 exits the die 132 in the direction of the arrow 201 and draws molten coating material 160 out of die 132 where the molten coating material 160 is cooled and forms a coating around the hollow base tube 122. The hollow base tube 122 may then enter the quench tank 140 where the coating is further cooled and solidifies, and the coated hollow tube 162 is formed.

In some examples, an impingement point 180 is within the die 132 between the pressure tube 150 and the second end 172 of the die 132. Where the second end 168 of the pressure tube 150 ends within the die 132, the hollow base tube 122 may contact molten coating material 160 which forms the impingement point 180 between the outer surface of the hollow base tube 122 and the inner diameter 174 of the die 132. The impingement point 180 may be formed by molten coating material 160 forced out of the extruder head 176 by the extruder 130 and filling the space between the hollow base tube 122 and the inside diameter of the die 132. At steady state, at the impingement point 180, the space around the hollow base tube 122 between the outside surface of the hollow base tube 122 and the inner diameter 174 of the die 132 is filled with molten coating material 160.

As shown in FIG. 3, the second end 168 of the pressure tube 150 is connected to and/or within the first end 171 of the die 132 and forms a fluid connection between the vacuum source 134 and the inside of the die 132. The vacuum source 134 may be configured to draw gas, such as air, from inside the die 132 through the pressure tube 150 to create a vacuum inside the die 132. Molten coating material 160 at the impingement point 180 may help prevent air from flowing into the die 132 from outside the coating system 120a through the second end 172 and past the impingement point 180. That is, the molten coating material 160 within the die 132 maintains a complete seal between the outer surface of the hollow base tube 122 and the inner diameter of the die 132. Molten coating material 160 may seal a vacuum within the die 132 between the impingement point 180 and the first end 170 of the die 132.

As previously disclosed, a vacuum inside the vacuum source 134 may be regulated to provide a suitable positive pressure inside the hollow base tube 122. Pressure within the die 132 may be controlled by the vacuum source 134 drawing vacuum through the pressure tube 150 and form a chamber pressure. The chamber pressure is a pressure inside the die 132 and outside hollow base tube 122, which may be controlled to provide suitable positive pressure within the hollow base tube 122. In some instances, maintaining a positive pressure inside the hollow base tube 122 provides radial strength to the hollow base tube 122 and helps prevent the hollow base tube 122 from collapsing or distorting in response to a radial pressure from molten coating material 160 or the die 132 without the need for a reinforcing core within the hollow base tube 122. Using the coating system 120a, a radial strength may be attained that is increased relative to a radial strength of the hollow base tube 122 without positive pressure inside the hollow base tube 122, such as prior to being passed through the vacuum source 134. With a positive pressure inside the hollow base tube 122, a radial strength may be maintained even while the hollow base tube 122 material is softened, such as by elevated temperatures in the die 132 and/or molten coating material 160.

In some examples, a coating pressure is the pressure applied by the molten coating material 160 against the hollow base tube 122 inside the die 132. The coating pressure may be controlled by controlling a speed at which the extruder 130 provides molten coating material 160 out of the extruder head 176 and/or into the die 132. The coating pressure may be used to drive or press molten coating material 160 onto the hollow base tube 122 and provide a uniform coat of molten coating material 160 on the hollow base tube 122. The coating pressure may be used to control the size of a coating on the coated base tube 162, which might not be achieved in a coating system with no vacuum source 134. During a coating process, the coating pressure may be controlled in relation to the following parameters: the speed of the hollow base tube 122 through the die 132, the outside diameter of the hollow base tube 122, the extruder volumetric flow rate, the die temperature, the molten coating material temperature, and the hollow base tube wall strength.

Figure 4:
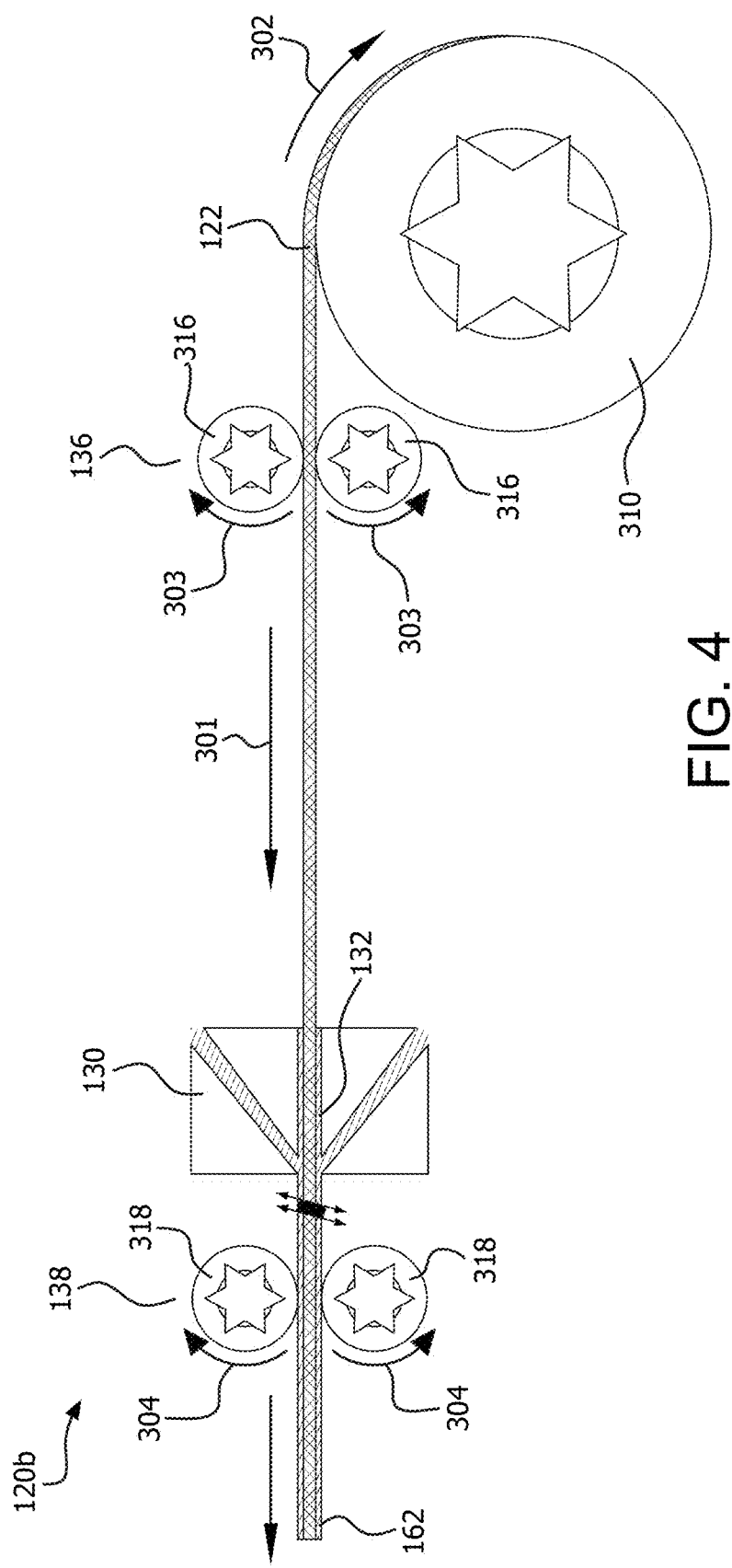
FIG. 4 is a schematic of a tension system for extrusion coating a hollow base tube, according to various examples.

FIG. 4 is a schematic view of a tension system 120b in accordance with various embodiments. The tension system 120b is shown with portions of the system 120 of FIG. 2 removed for ease of illustration. The tension system 120b may be used to control a tension on hollow base tube 122 as it is fed through the coating system 120a, and/or may be used to control the speed of the hollow base tube 122 in the direction shown by the arrow 301.

As shown in FIG. 4, the tension system 120b includes an unwind 310, a feed drive 136, and a pull drive 138. The feed drive 136 may include first nip rollers 316, and the pull drive 138 may include second nip rollers 318.

The unwind 310 may provide a brake force to the hollow base tube 122 in the direction of the arrow 302 and control a tension on the hollow base tube 122 as the hollow base tube 122 is provided from a source, such as a roll or spool of hollow base tube 122. The first nip rollers 316 may be configured to grip the hollow base tube 122 and control the tension on hollow base tube 122 as the first nip rollers 316 turn in the direction shown by the arrows 303. The feed drive 136 turns the first nip rollers 316 and controls tension on the hollow base tube 122 between unwind 310 and the feed drive 136. The feed drive 136 is controlled to take the hollow base tube 122 from the unwind 310. The feed drive 136 may control a radially compressive force exerted on the hollow base tube 122 by the first nip rollers 316 to help prevent the hollow base tube 122 from collapsing. For example, the top and bottom rollers of the first nip rollers 316 may rotate at different speeds from each other.

The second nip rollers 318 may be configured to grip the coated hollow tube 162 and control the tension on the coated hollow tube 162 as the second nip rollers 318 turn in the direction shown by the arrows 304. The pull drive 138 may be controlled to turn the second nip rollers 318 and control the tension on the coated hollow tube 162 between the feed drive 136 and the pull drive 138. The pull drive 138 is controlled to take coated hollow tube 162 from the extruder 130 and/or the die 132. The pull drive 138 may control a radially compressive force exerted on the coated hollow tube 162 by the second nip rollers 318 so as not to collapse the coated hollow tube 162 and not to damage the outer layer or coating on the coated hollow tube 162. For example, the top and bottom rollers of the second nip rollers 318 may rotate at different speeds from each other.

In some examples, the tension system 120b controls the tension along the hollow base tube 122 by synchronizing the feed drive 136 and the pull drive 138. This may help prevent elongation of the hollow base tube 122 from tension applied to the hollow base tube 122, and may help prevent imparting a radially compressive force to the hollow base tube 122. The tension system 120b is used to control the tension on the hollow base tube 122 as it passes through the extruder head 176 and the die 132. The feed drive 136 may actively feed, or push, the hollow base tube 122 into the die 132, to inhibit stretching due to tension on the hollow base tube 122. Actively feeding the hollow base tube 122 into the die 132 is advantageous when coating a hollow base tube 122 that comprises soft or low durometer materials such as soft polymers. Controlling the tension along the length of the hollow base tube 122 may be achieved by using the feed drive 136 to actively feed the hollow base tube 122 into coating system 120a. Actively feeding the hollow base tube 122 using the feed drive 136 decreases tension along the length of hollow base tube 122, and may help prevent elongation of hollow base tube 122. Controlling the tensile force on the hollow base tube 122 may control the dimensional stability of the hollow base tube 122, for example, while a coating is applied.

The tension control may be tailored for the hollow base tube 122 having certain durometers to help prevent stretching of the hollow base tube 122. The tension control may be controlled for a hollow base tube 122 having known durometers, for example, softer materials such as low melt polymers. As the hollow base tube 122 travels through the die 132 and is heated by the die 132 or the molten coating material 160, the hollow base tube 122 may soften. Because of the conservation of mass, if the hollow base tube 122 is stretched in the longitudinal direction, plastic deformation of the hollow base tube 122 may cause the hollow base tube 122 to reduce in diameter. A narrowed diameter of the hollow base tube 122 may lead to undesired results in the coating system 120a, such as forming an unsuitably sized gap between the outer diameter of the hollow base tube 122 and the inner diameter of the die 132, which may lead to an unsuitable coating layer thickness. An unsuitably sized gap between the outer diameter of the hollow base tube 122 and the inner diameter of the die 132 may also lead to a loss of vacuum within the die 132 by inhibiting formation of a complete seal at the impingement point 180, shown in FIG. 3. This may also lead to inadequate radial strength in the hollow base tube 122 as it passes through the die 132. The tension system 120b may be used to ensure the hollow base tube 122 is not stretched while heated and/or softened and may be controlled in relation to the coating system 120a, shown in FIG. 3.

The tension system 120b may also be used to control the line speed of the hollow base tube 122 through the coating system 120a. A suitable line speed through the coating system 120a draws molten coating material 160 out of the die 132 at a flow rate that matches the volumetric flow rate of molten coating material 160 from the extruder 130 and removes molten coating material 160 from the die 132 before molten coating material 160 can be drawn upstream through the pressure tube 150. Thus, during suitable operating conditions, line speed is synchronized with a volumetric flow rate from the extruder 130 to ensure that a complete seal is maintained at the impingement point 180 and that vacuum does not draw molten coating material 160 through the pressure tube 150 and into the vacuum source 134.

The system disclosed herein may be suitable for producing a coated hollow tube with reduced voids, or that is free or substantially free of voids within the coated hollow tube material, such as between layers of the coated hollow tube or within coated layer(s). Bubbles or air entrainment between layers of a coated hollow tube may lead to formation of voids. Voids are spaces between the inner surface and the outer surface of the coated hollow tube, such as within the bulk material or between layers of the coated hollow tube, that are filled with gasses such as air. Voids may lead to delamination of the layers of the coated hollow tube, such as delamination of an outer layer from hollow base tube. Delamination may lead to failure of the coated hollow tube during use. In some instances, voids may reduce visual clarity through a coated hollow tube, such as a coated hollow tube made from transparent or substantially transparent material. In some instances, greater visibility through coated hollow tube is desired, for example, for a healthcare practitioner using a coated hollow tube as a device for delivering blood or therapeutic agents into a patient. For certain applications, it may be desirable to be able see though the coated hollow tube, for example, to see if air bubbles are present in a fluid flowing through the coated hollow tube.

The system disclosed herein may be suitable for coating hollow base tubes having textured outer surfaces, such as an outer surface defined by a reinforcing layer. Forming a vacuum around a hollow base tube when coating material is applied draws coating material around the hollow base tube and may lead to better contact area of coating material with hollow base tube, such as by increasing wetting of coating material onto hollow base tube. Additionally, drawing a vacuum around the hollow base tube when a coating material is applied may pull air that would otherwise be trapped between the hollow base tube and coating material. This is particularly advantageous for hollow base tubes having textured outer surfaces, such as from a reinforcing layer. The system disclosed herein provides suitable vacuum control within a coating system, which may reduce the entrainment of bubbles around a hollow base tube when coating is applied. Drawing vacuum from around the hollow base tube allows for suitable wetting of the coating material to the hollow base tube, even at faster coating speeds. Generally, the faster the speed of a hollow base tube through a coating device, the faster a coating has to be applied. Applying a coating at high speeds may lead to greater air entrapment. Air entrapment is undesired due to the formation of voids and reduced bonding strength between layers of a coated hollow tube. The systems and methods disclosed herein may be used to control a vacuum around a hollow base tube and be used to bond an outer layer to the hollow base tube, which may provide suitable coating at faster line speeds, i.e. the hollow base tube can be drawn through the coating system at faster speeds.

The systems disclosed herein may also be suitable for producing a coated hollow tube that is free or substantially free of particulate matter within an inner lumen of the coated hollow tube. The system disclosed herein may also be suitable for producing a coated hollow tube that has a smooth or substantially smooth inner surface within an inner lumen of the final hollow tube.

The afore-mentioned systems and methods are optionally employed using a traditional base tube with a reinforcing core. Generally, one method of forming a coated hollow tube is to provide a solid material as a reinforcing core to provide radial strength or a mold for forming the inner layer of the coated hollow tube. In general, a reinforcing core may be provided, over which a molten material may be coated, producing an inner layer. The reinforcing core provides a mold or structural support for the molten material as it is cooled and solidified to form the inner layer. The inner layer alone may form a hollow base tube. Alternatively, additional layers such as a reinforcing layer may be applied to the inner layer, to form a hollow base tube. Typically, the reinforcing core is maintained within the inner layer while additional layers, such as a reinforcing layer and/or an outer layer is added, to provide radial strength to the hollow base tube. An inner layer of first material may be formed, and a reinforcing layer, for example, formed of one or more strands of reinforcing layer material, may be overlaid on the inner layer to form a hollow base tube. Typically, the reinforcing core is left within the inner layer while the reinforcing layer is added, to provide radial strength to the inner layer, for example if the inner layer has a low mechanical strength (e.g. from a thin inner layer wall or a low durometer polymer) while the reinforcing layer is applied. The radial tension applied to the inner layer while the reinforcing layer is applied is controlled such that the inner layer is not crushed or distorted. Once the reinforcing layer is added to the inner layer to form the hollow base tube an outer layer may be added to form a coated hollow tube. In general, the reinforcing core is left within the inner layer while an outer layer is applied to provide radial strength to the hollow base tube. For example, applying hot molten coating material to the inner layer may heat the inner layer material close to the inner layer material melting point and/or above the inner layer material glass transition temperature. This may occur if the outer layer material is the same material as the inner layer material, or if the outer layer material has a higher melting temperature and/or higher glass transition temperature than the inner layer material. Heating the inner layer material may cause the inner layer material to soften, for example, if the inner layer comprises a polymer material such as a plastic. If the inner layer material softens, the hollow base tube may collapse, particularly if an inward radial force is applied to the hollow base, such as from pressure from applying the outer layer material onto the hollow base tube.

After forming the coated hollow tube using a reinforcing core, the reinforcing core is removed, for example, by pulling the reinforcing core out of the inner layer. Pulling the reinforcing core from the coated hollow tube may result in the formation of particulate matter, such as particulates of material from the reinforcing core and/or material from the inner layer. Particulates may be produced by delamination of the reinforcing core from the inner layer and/or abrasion of the reinforcing core with the inner surface of the inner layer. Forming an inner layer over a reinforcing core and/or separating the reinforcing core from the inner layer may also produce an inner layer having an inner surface that is rough or textured. That is, the inner surface of the inner layer may have an inner surface texture having a roughness (Ra). A coated hollow tube having particulates within the inner lumen may be less desirable for certain applications, such as healthcare applications. For example, a coated hollow tube may be desired for providing blood or therapeutic agents to a patient. Particulates within the inner lumen of a coated hollow tube may form contaminants, and make the coated hollow tube less desirable for healthcare purposes and may require the addition of cleaning steps, for example. Additionally, an inner layer having an inner surface that is rough or textured may be unsuitable, for example by imparting a matte texture to the inner surface. A rough or matte surface may reduce visual clarity through the coated hollow tube, which may render the coated hollow tube unsuitable for certain applications, such as healthcare applications. Additionally or alternatively, an inner layer having a textured or rough inner surface may increase a friction factor for fluids flowing within the inner lumen. The step of pulling the reinforcing core from the coated material may also add an additional step during manufacturing, which may increase the cost and/or time required for the manufacturing process. Removing the reinforcing core may also introduce ergonomic issues to a manufacturing process.

Using the system disclosed herein, a coated hollow tube may be formed without the use of a reinforcing core, and the coated hollow tube may be free or substantially free of particulate matter within an inner lumen of the coated hollow tube that might otherwise be present from removal of a reinforcing core from the coated hollow tube, for example. Although the system disclosed herein may provide a coated hollow tube that is optically transparent, in various examples the systems and methods are used to provide translucent, opaque, or substantially opaque coated hollow tubes that are free or substantially free of particulate matter within the inner lumens of the coated hollow tubes. The system disclosed herein may produce a coated hollow tube that has a smooth or substantially smooth inner surface within an inner lumen of the coated hollow tube. The system disclosed herein may also remove the need for an additional manufacturing step to remove the reinforcing core from the coated hollow tube. The system may also remove the need to cut the coated hollow tube into shortened lengths to facilitate removing the reinforcing core. The system disclosed herein may provide a coated hollow tube without the use of a reinforcing core and as a continuous process, without the need for forming shortened lengths of coated hollow tube as a batch process.

In some examples, a method of forming a coated hollow tube includes first forming a hollow base tube. The hollow base tube may include a continuous inner layer defining an inner surface of the hollow base tube. The hollow base tube may be formed by first forming the inner layer, for example by extruding material to form the inner layer. For example, the inner layer may be formed by straw extrusion. As previously discussed, forming an inner layer without using a reinforcing core, such as by straw extrusion, may produce a coated hollow tube having reduced particulates and a smooth inner surface. In some examples, the inner layer may comprise material that is flexible. In some examples, the inner layer may comprise material that is transparent or substantially transparent. In general, a transparent material is one that allows light to pass through so that objects behind the material can be distinctly seen. In some examples, the inner layer may comprise a material that is suitable for healthcare applications, such as material that is suitable for medical use. Inner layer may comprise a material that can be shaped as a tube using an extrusion process. In some examples, inner layer may comprise a polymer material such as a plastic or a rubber. In some examples, inner layer material may comprise a polymer such as polyurethane, polyethylene, polypropylene, polyester, polyamides such as nylon, polyethers such as polyether ether ketone (PEEK) or polyether block amides such as those provided under the tradename Pebax®. Inner layer may have any inner diameter and/or wall thickness that can be formed using an extrusion process. Inner layer may have an inner diameter as small as about 0.01 inches (0.025 cm), about 0.05 inches (0.127 cm), or about 0.10 inches (0.25 cm) or as wide as about 0.20 inches (0.51 cm), about 0.30 inches (0.76 cm), or about 0.40 inches (1.0 cm), or a diameter between any pair of the foregoing values, for example, although additional values are also contemplated. Inner layer may have a wall thickness as small as about 0.002 inches (0.005 cm), about 0.004 inches (0.010 cm), or about 0.006 inches (0.015 cm) or as wide as about 0.010 inches (0.025 cm), about 0.020 inches (0.051 cm), or about 0.030 inches (0.076 cm), or a thickness between any pair of the foregoing values, for example, although additional values are also contemplated.

In some examples, a reinforcing layer is added to the inner layer, such as by overlaying reinforcing layering onto the inner layer. The reinforcing material may comprise flexible material that also provides strength to the hollow base tube in the radial and longitudinal direction. The reinforcing layer may comprise a transparent or substantially transparent material. In some examples, the reinforcing layer may include a metal, a metal alloy, a polymer, or any other suitable material. The reinforcing layer may include reinforcing material arranged as a braided, coiled, helical, spiral wound, or weaved pattern. The reinforcing layer may include reinforcing material arranged as a braided, coiled, helical, spiral wound, or weaved pattern that has a variable pitch along a length of the hollow base tube. That is, reinforcing material may include strands of material arranged in a braided, coiled, helical, spiral wound, or weaved pattern and the pattern may have an angle that is different at various locations along a length of the hollow base tube. Reinforcing material may include any material that can be fashioned into elongated strands or threads, for example: stainless steel, mono-filament polymer fibers, ePTFE fibers, fiberglass, a shape memory alloy such as nitinol, or an aramid fiber such as those provided under the tradename Kevlar®. In some instances, the reinforcing layer includes a braided nylon material (e.g. nylon 6, nylon 6/6, nylon 6/12, etc.).

In some examples, a method of forming a coated hollow tube includes passing the hollow base tube into a vacuum source. Passing the hollow base tube into a vacuum source may comprise passing the hollow base tube into a pressure tube having openings in fluid communication with a vacuum source. The hollow base tube may be passed through a pressure tube that provides a pressure outside the hollow base tube that is lower than an internal positive pressure within an inner lumen of the hollow base tube. In some configurations, the hollow base tube is passed through more than one vacuum chamber arranged in series. The hollow base tube may be passed through a first vacuum chamber, that maintains a first negative air pressure within the first vacuum chamber that is lower than an air pressure outside the first vacuum chamber; and through a second vacuum chamber that is downstream from the first vacuum chamber, and maintains a second negative air pressure within the second vacuum chamber that is lower than the first negative air pressure.

In some examples, the hollow base tube is passed through the vacuum source and through a die that coats a molten coating material onto the hollow base tube, for example, a coating die. The hollow base tube may be passed through a coating die having a chamber pressure prior to the impingement point that is lower than an internal positive pressure within an inner lumen of the hollow base tube. The hollow base tube may be passed through a coating die that is in fluid communication with the vacuum source and is configured to draw vacuum around the hollow base tube within the coating die. Coating material may be provided to the coating die using an extruder that provides molten coating material into the coating die. The hollow base tube may be passed from the vacuum source into the coating die and through a point of impingement where the coating material is applied to the hollow base tube. The coating material may be pressure applied by the molten coating material as the molten coating material is applied onto the hollow base tube by the die. A positive pressure may be maintained inside the hollow base tube as the coating material is applied to the hollow base tube. A positive pressure may be maintained within the inner lumen of the hollow base tube relative to a pressure outside the hollow base tube. A seal may be maintained between the coating die and the hollow base tube with the coating material and a vacuum may be maintained around the hollow base tube inside the coating die. A coated hollow tube may be formed having an outer diameter as small as about 0.030 inches (0.076 cm), about 0.080 inches (0.203 cm), or about 0.144 inches (0.366 cm), to as large as about 0.20 inches (0.51 cm), about 0.30 inches (0.76 cm) or about 0.40 inches (1.01 cm), or a diameter between any two of the foregoing diameters, for example, although additional values are contemplated. A coated hollow tube may be formed having a tube wall thickness as low as about 0.007 inches (0.018 cm), or about 0.010 inches (0.025 cm) or as thick as about 0.020 inches (0.051 cm), about 0.040 inches (0.102 cm), or about 0.060 inches (0.152 cm), or a thickness between any pair of the foregoing values, for example, although additional values are also contemplated.

In some examples, a chamber pressure prior to the impingement point is maintained outside the hollow base tube that is lower than a pressure within the inner lumen of the hollow base tube. A chamber pressure may be maintained within the die that increases the radial strength of the hollow base tube relative to a radial strength of the hollow base tube prior to being passed through the first vacuum chamber. A suitable chamber pressure may be controlled to inhibit the hollow base tube from collapsing from the coating pressure exerted onto the hollow base tube by molten coating material. A method of forming a coated hollow tube may include balancing the operating parameters of the coating system and the tension system with the strength of the hollow base tube, which is defined by the combination of the wall thickness of the hollow base tube and the durometer of the hollow base tube material. For example, given the wall thickness and durometer for a hollow base tube, the vacuum and extruder pressure can be controlled to help prevent collapsing or bursting the hollow base tube, and the line speed and/or tension on the hollow base tube can be controlled to help prevent stretching or expanding the hollow base tube. Operating parameters that may be controlled when forming a coated hollow tube include controlling the pressure produced by coating material from the extruder, the pressure in the hollow base tube, a chamber pressure around the hollow base tube, ambient pressure outside the die, a line speed of the hollow base tube through the die, the extruder operating temperature, and the molten coating material temperature.

In certain instances, the methods and systems disclosed herein may be used to form an outer layer on a base tube having a reinforcing core within the base tube. Methods and systems using the vacuum system disclosed above may be used to apply an outer layer on a base tube having a reinforcing core, and provide an outer layer that has a superior bond strength to the base tube compared to a bond strength of an outer layer applied to a base tube using systems or methods without the vacuum system disclosed herein.

FIG. 5A is a photograph of a coated hollow tube 510 that was formed using previously available methods. FIG. 5B is a line drawing of the features of the coated hollow tube 510. FIGS. 5A and 5B are a view through the coated hollow tube 510 from the radial direction of the coated hollow tube 510. A reinforcing layer 514 is visible as a braided structure of strands 518 in an overlapped crossing formation. Tubing material 512 comprising an inner layer and an outer layer is visible between strands 518 of reinforcing layer 514. As shown in FIGS. 5A and 5B, in the coated hollow tube 510 made from previously available methods, void paths 520 are present along the length of strands 518. Void paths 520 are present along the length of the strands 518 between the strands 518 and tubing material 512. Also visible in FIGS. 5A and 5B are voids 524 within the tube material 512. Void paths 520 indicate a lack of a continuous bond between strands 518 of braided structure and tubing material 512. Voids 524 may also indicate a lack of a complete bond between outer layer and inner layer of tubing material 512.

FIG. 6A is a photograph of a coated hollow tube 530 that was formed using previously available methods. FIG. 6B is a line drawing of the features of the coated hollow tube 530. FIGS. 6A and 6B are a view through the coated hollow tube 530 from the radial direction. The reinforcing layer 534 is visible as a braided structure formed of strands 538 in an overlapped crossing formation. Tubing material 532 comprising an inner layer and an outer layer is visible between strands 538 of reinforcing layer 534. As shown in FIGS. 6A and 6B, in the coated hollow tube 530 formed using previously available methods, voids 542 are present along the length of strands 538. Voids 542 are present along the length of the strands 538 between strands 538 and tube material 532. Also visible in FIGS. 6A and 6B are voids 540 within the tube material 532. Voids 540 indicate a lack of a complete bond between the outer layer and the inner layer of tubing material 532.

FIG. 7A is a photograph of a coated hollow tube 550 that was formed using the systems and methods disclosed above, in accordance with an embodiment. FIG. 7B is a line drawing of the features of the coated hollow tube 550. FIGS. 7A and 7B are a view through the coated hollow tube 550 from the radial direction. Reinforcing layer 554 is visible as a braided structure formed of strands 558 in an overlapped crossing formation. Tubing material 552 comprising an inner layer and an outer layer is visible between strands 558 of reinforcing layer 554. As shown in FIGS. 7A and 7B, the coated hollow tube 550 formed according to examples of the instant disclosure have reduced voids, and may be relatively free of voids along the strands 558. As also shown in FIGS. 7A and 7B, the coated hollow tube 550 made according to examples of the instant disclosure has reduced voids, and may be substantially free of voids between inner layer and outer layer. That is, the coated hollow tube 550 formed using systems and methods according to examples of the disclosure has substantially fewer voids per unit of length of coated hollow tube 550 than coated hollow tubes formed using previously available systems and methods, such as those shown in FIGS. 5A, 5B, 6A, and 6B. As shown in in FIGS. 7A and 7B, the coated hollow tube 550 formed using the systems and methods of the instant disclosure has greater encapsulation of reinforcing layer 554 by tubing material 552, and improved bonding between inner layer and an outer layer of tubing material 552, than coated hollow tubes formed using previously available systems and methods.

Figure 8A:
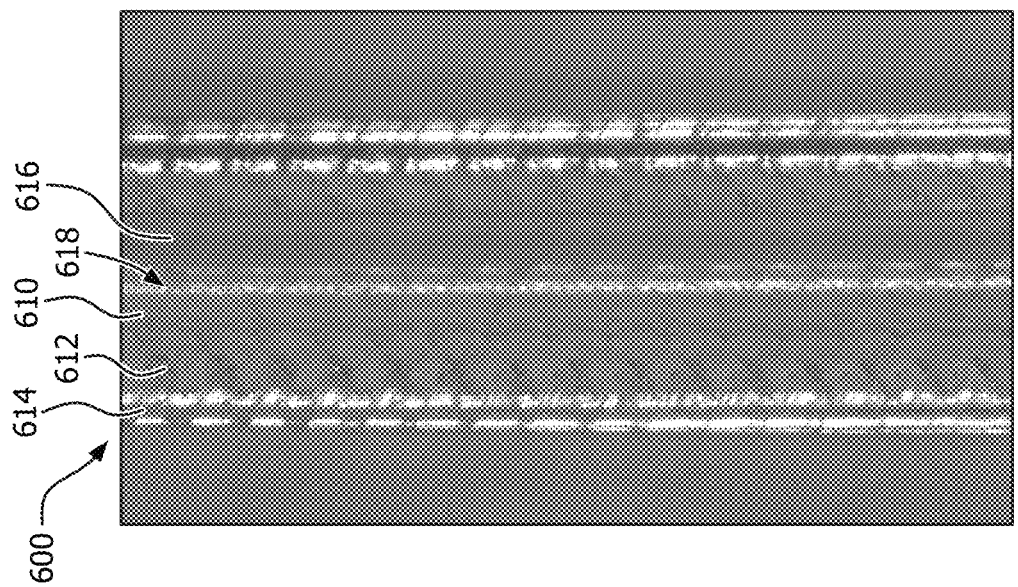
FIG. 8A is a photograph of a coated hollow tube cut through the center of the coated hollow tube along the length, in accordance with the prior art methods.
Figure 8B:
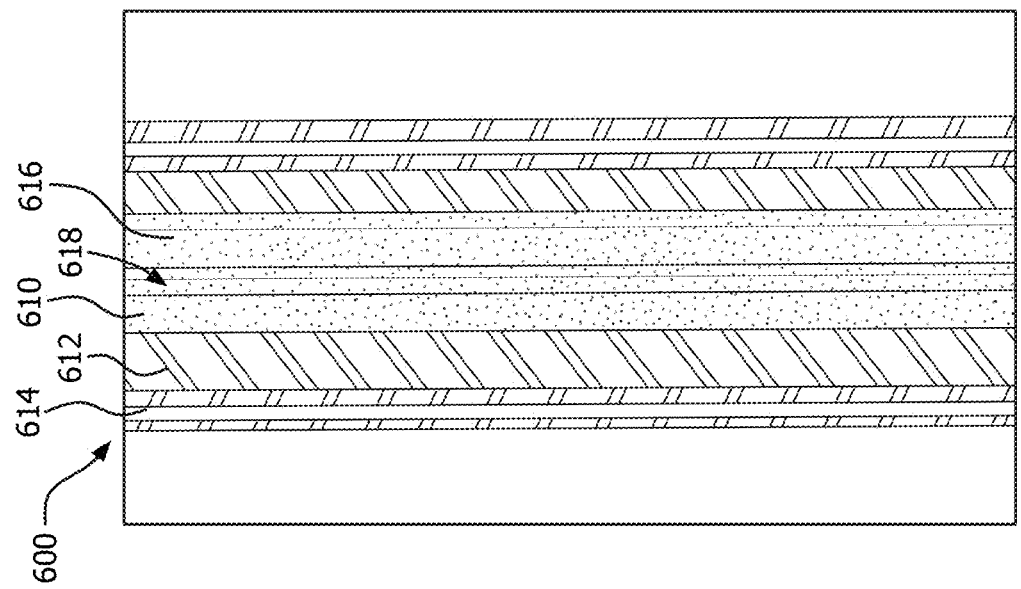
FIG. 8B is a line drawing of the features of the coated hollow tube shown in FIG. 8A.

FIG. 8A is a photograph of a coated hollow tube 600 that was formed using previously available methods. FIG. 8B is a line drawing of the features of the coated hollow tube 600. FIGS. 8A and 8B are a cross-sectional view of the coated hollow tube 600 cut through the center along the length of the coated hollow tube 600. An inner layer, 610, a reinforcing layer 612, and an outer layer 614 are shown. As shown in FIGS. 8A and 8B, the inner surface 618 of the coated hollow tube 600 has roughness or texture 616 on the inner surface 618 of the coated hollow tube 600. This texture is visible as a matte surface, i.e. a rough or granular surface.

Figure 9A:
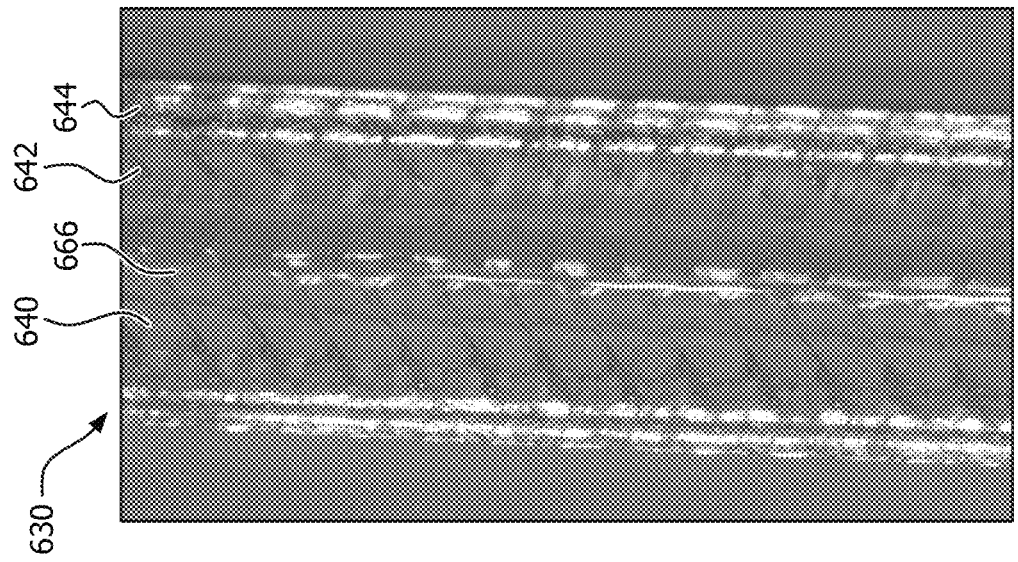
FIG. 9A is a photograph of a coated hollow tube cut through the center of a coated hollow tube along the length, according to various examples.
Figure 9B:
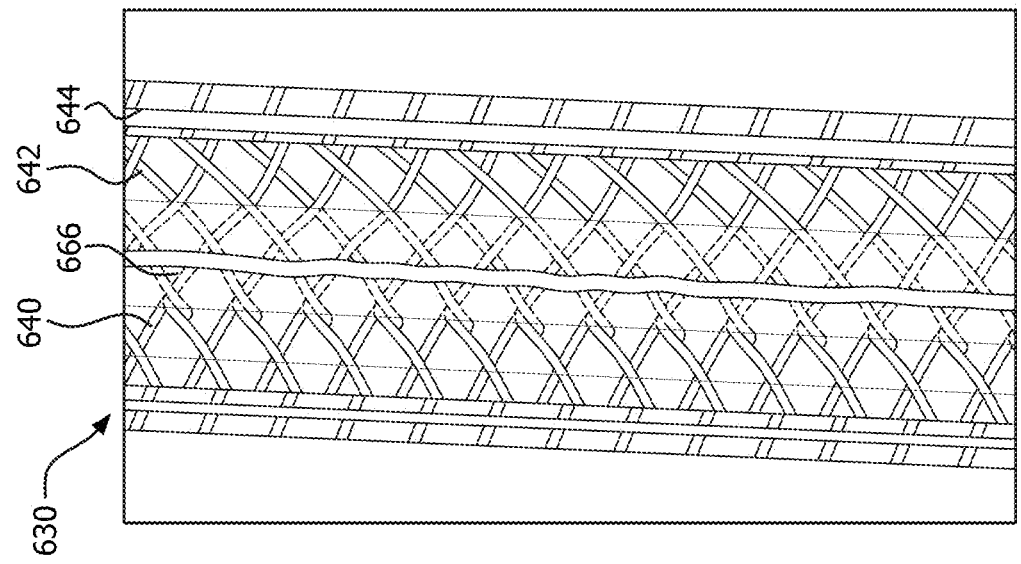
FIG. 9B is a line drawing of the features of the coated hollow tube shown in FIG. 9A.

FIG. 9A is a photograph of a coated hollow tube 630 that was formed using the systems and methods disclosed above, in accordance with embodiments. FIG. 9B is a line drawing of the features of the coated hollow tube 630. FIGS. 9A and 9B are a cross-sectional view of coated hollow tube 630 cut through the center of coated hollow tube 630 along the length. An inner layer, 640, a reinforcing layer 642, and an outer layer 644 are shown. As shown in FIG. 9A, an inner surface 666 of coated hollow tube 630 lacks a surface roughness. As shown in FIG. 9A, the coated hollow tube 630 has an inner surface 666 free of a surface roughness or matte on the inner surface 666 of coated hollow tube 630. That is, comparing the coated hollow tube 630 that was made using the system and methods disclosed above with the coated hollow tube 600 made from previously available methods, the coated hollow tube 630 shown in FIGS. 9A and 9B has a smooth or substantially smooth inner surface 666 compared to a relatively more textured or matte surface on the inner surface 618 shown in FIGS. 8A and 8B.

Figure 10:
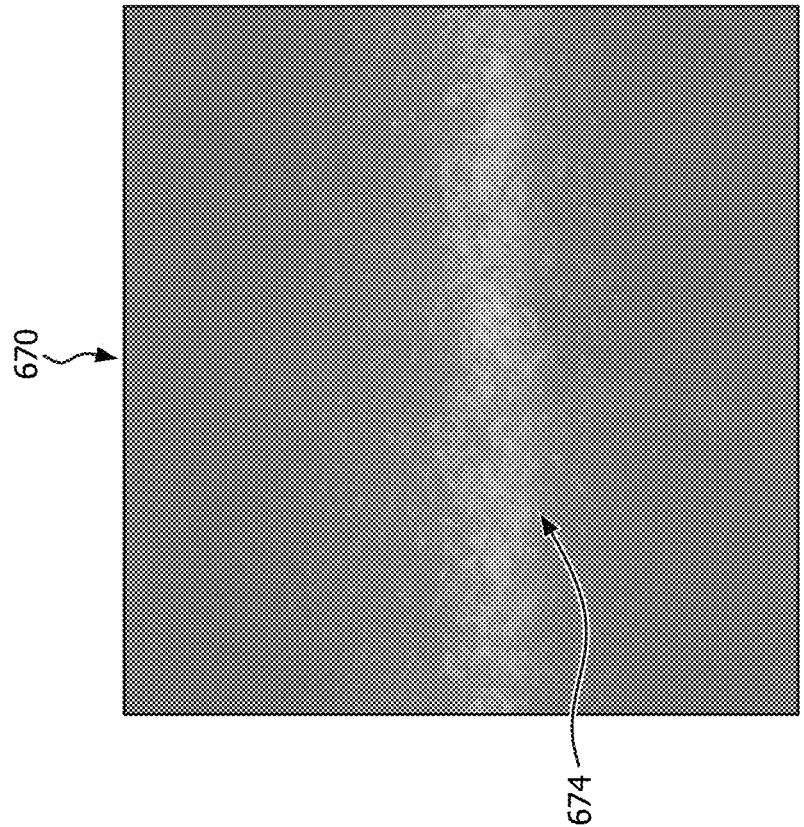
FIG. 10 is a photograph taken with an optical microscope of an inner surface of a coated hollow tube, in accordance with the prior art methods.

FIG. 10 is a photograph of a coated hollow tube 670 that was made using previously available methods. FIG. 10 is a view of an inner surface 674 of the inner lumen of the inner layer. The coated hollow tube 670 was formed using a reinforcing core within inner layer and then removed. As shown in FIG. 10, the inner surface 674 of the inner layer has a matte finish which reduces an optical clarity of the inner layer of a coated hollow tube 670 made with a reinforcing core. As previously discussed, a matte finish may be provided for the inner surface 674 by removing the reinforcing core from the inner surface 674 after the inner layer is formed.

Figure 11:
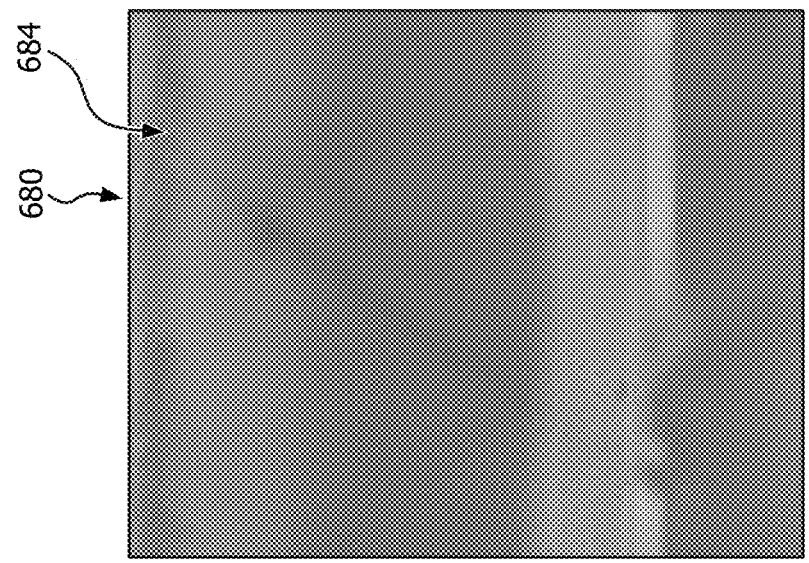
FIG. 11 is a photograph taken with an optical microscope of an inner surface of a coated hollow tube, according to various examples.

FIG. 11 is a photograph of a coated hollow tube 680 that was made using systems and methods according to examples of the present disclosure. FIG. 11 is a view of an inner surface 684 of the inner lumen of the inner layer. As shown in FIG. 11, the inner surface 684 of the inner layer has a smooth finish. The smooth inner surface of the coated hollow tube 680 has better optical clarity than the coated hollow tube 670 that was made using previously available methods, shown in FIG. 10.

Figure 13:
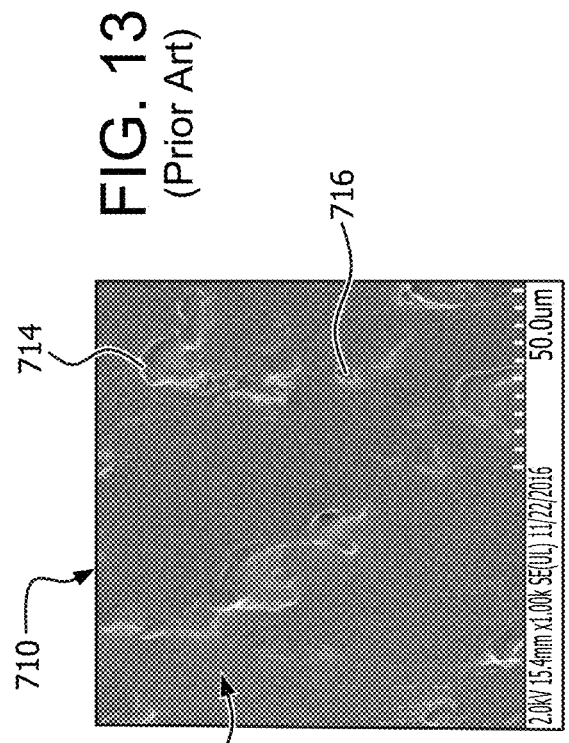
FIG. 13 is a photograph taken with a scanning electron microscope of an inner surface of an inner layer of a coated hollow tube, in accordance with the prior art methods.
Figure 12:
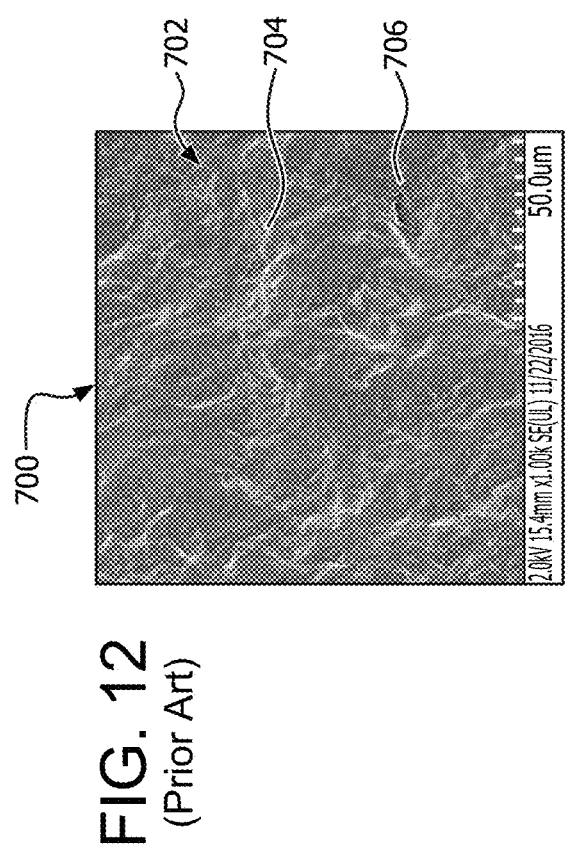
FIG. 12 is a photograph taken with a scanning electron microscope of an inner surface of an inner layer of a coated hollow tube, in accordance with the prior art methods.
Figure 14:
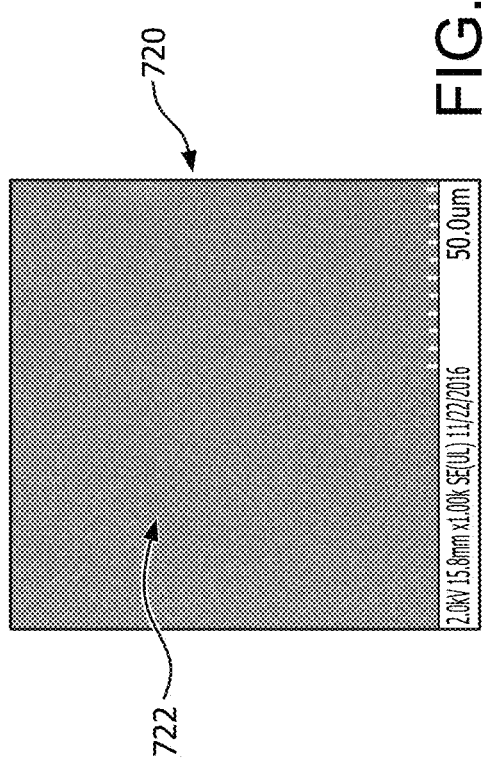
FIG. 14 is a photograph taken with a scanning electron microscope of an inner surface of an inner layer of a coated hollow tube, according to various examples.

FIGS. 12, 13, and 14 are micrographs taken with a scanning electron microscope at 100× magnification of an inner surface of an inner layer of three different three samples of coated hollow tubes, each with an outer diameter of 0.188 inches (0.478 cm). Sample 1 (700) and sample 2 (710) are two different coated hollow tubes that were formed using previously available methods that included using a reinforcing core to form the inner layer. The reinforcing core was removed after the outer layer was formed on samples 1 (700) and 2 (710). FIGS. 12 and 13 show the inner surfaces 702, 712 of the inner layer of samples 1 (700) and 2 (710). FIG. 14 shows the inner surface 722 of the inner layer of sample 3 (720) which is a coated hollow tube formed using systems and methods according to examples of the present disclosure. As shown in FIG. 12, forming a coated hollow tube using a reinforcing core produces an inner layer having an inner surface 702 that is rough and has a texture over the inner surface 702. The height of the inner surface 702 of sample 1 (700) varied along the inner surface 702 and defined crests 704 and valleys 706. The inner surface 712 of an inner layer of sample 2 (710) shown in FIG. 13 is also textured and defines crests 714 and valleys 716. By comparison, the inner surface 722 of sample 3 (720) shown in FIG. 14 is substantially smooth and lacks the texture and surface roughness of the inner surfaces 700, 710 of samples 2 and 3 (700, 710). Comparing the micrographs of FIGS. 12, 13, and 14, it can be seen that systems and methods according to examples of the present disclosure produce an inner surface of an inner layer that is substantially smooth at a magnification of 100×. The surface roughness of the inner surfaces 702, 712, 722 were measured using a non-contact white light interferometer (Zygo® NewView 5032, with MetroPro® software, available from Lambda Photometrics Ltd. of Hertfordshire, UK). Surface roughness measurements taken with the white light interferometer showed the roughness of the inner surfaces 702, 712 of samples 1 and 2 (700, 710) to be six times greater than the roughness of the inner surface 720 of sample 3 (720).

Figure 16:
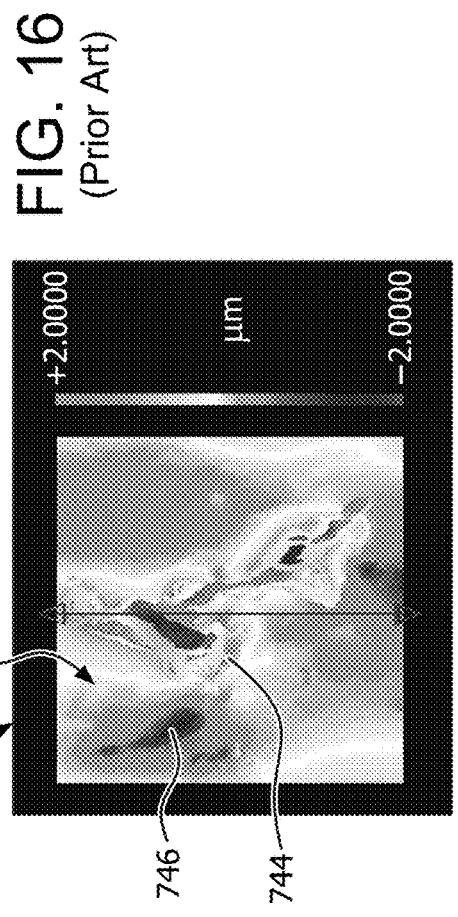
FIG. 16 is a contour image of an inner surface of an inner layer of a coated hollow tube, in accordance with the prior art methods.
Figure 15:
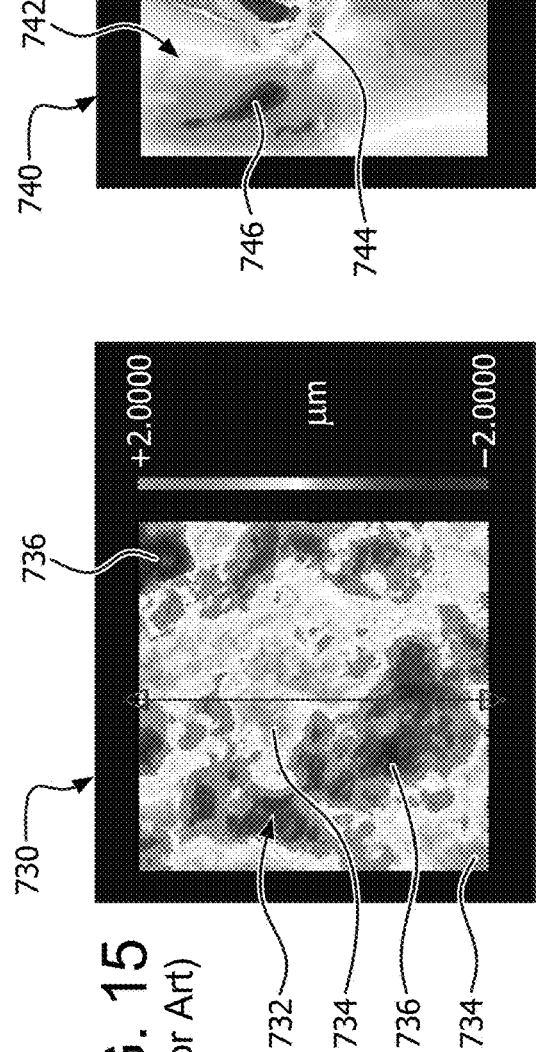
FIG. 15 is a contour image of an inner surface of an inner layer of a coated hollow tube, in accordance with the prior art methods.
Figure 17:
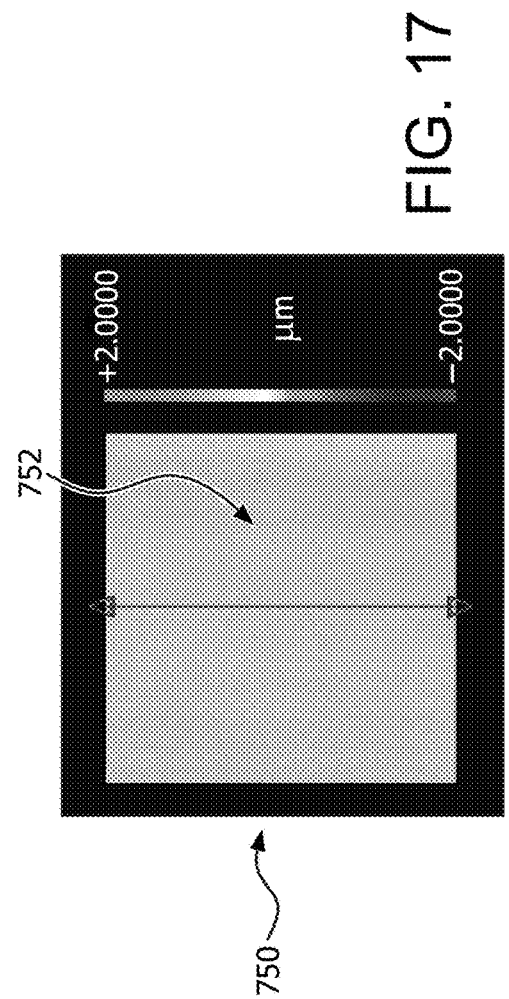
FIG. 17 is a contour image of an inner surface of an inner layer of a coated hollow tube, according to various examples.

FIGS. 15, 16, and 17 are contour images of surface views taken with a field of vision of 0.072 mm by 0.052 mm of three different samples of coated hollow tubes, each having an outer diameter of 0.188 inches (0.478 cm). Sample 4 (730) and sample 5 (740) are two different coated hollow tubes formed using previously available methods that included using a reinforcing core to form the inner layer. FIG. 17 shows the inner surface 742 of the inner layer of sample 6 (750) which is a coated hollow tube formed using systems and methods according to examples of the present disclosure. As shown in FIG. 15, sample 4 (730) has a rough texture over the inner surface 732. The height of the inner surface 732 of sample 4 (730) defines crests 734 and valleys 736 that can be compared to the legend on the right side of FIG. 15 showing a maximum measured height and depth of ±2.000 μm. The inner surface 742 of an inner layer of sample 5 (740) shown in FIG. 16 is also textured and defines crests 744 and valleys 746. By comparison, the inner surface 752 of sample 6 (750), shown in FIG. 17 is substantially smooth and lacks the texture and surface roughness of samples 4 (730) and 5 (740). The surface roughness of the inner surfaces 732, 742, 752 of samples 4 (730), 5 (740), and 6 (750) were quantified using a non-contact white light interferometer (Zygo® NewView 5032, with MetroPro® software, available from Lambda Photometrics Ltd. of Hertfordshire, UK). Tables 1 to 4, contain numerical values of the surface roughness measurements.

Three roughness measurements of surface views with a field of vision of 0.072 mm by 0.052 mm (corresponding to setting of 50× objective and 2× camera zoom) were taken of each inner surface of samples 4 (730), 5 (740), and 6 (750); these are shown in Table 1. Three roughness measurements of surface views with a field of vision of 0.14 mm by 0.11 mm (corresponding to setting of 50× objective and 1× camera zoom) were taken of each inner surface of samples 4 (730), 5 (740), and 6 (750); these are shown in Table 2 The average of the three values of the roughness measurement for each sample and the standard deviation is given in Tables 1 and 2.

The roughness parameters are as follows. PV is a maximum crest-to-valley height, which shows the absolute value between the highest and lowest points on the surface. H is the roughness between two predefined lines. RMS is the root mean square roughness, which is the average of the measured deviation from a plane fit. Ra is the average surface roughness, which is the arithmetic average of the absolute values from a plane fit. That is, as measured in accordance with ASME B46.1, Ra is the arithmetic average of the values of the profile height deviations from the mean line, recorded within the evaluation length.

TABLE 1

Roughness measurements of surface views with a field of vision of 0.072 mm by 0.052 mm

|  |  | PV | H | RMS | Ra |
|---|---|---|---|---|---|
| Sample 4 | Average | 4.677 | 1.762 | 0.631 | 0.483 |
| (previous method) | Standard Deviation | 0.927 | 0.484 | 0.158 | 0.109 |
| Sample 5 | Average | 4.051 | 1.070 | 0.432 | 0.290 |
| (previous method) | Standard Deviation | 0.593 | 0.286 | 0.134 | 0.092 |
| Sample 6 | Average | 0.168 | 0.052 | 0.018 | 0.015 |
| (present disclosure | Standard Deviation | 0.023 | 0.007 | 0.003 | 0.002 |

TABLE 2

Roughness measurements of surface views with a field of vision of 0.14 mm by 0.11 mm

|  |  | PV | H | RMS | Ra |
|---|---|---|---|---|---|
| Sample 4 | Average | 5.027 | 1.703 | 0.607 | 0.474 |
| (previous method) | Standard Deviation | 0.756 | 0.175 | 0.083 | 0.055 |
| Sample 5 | Average | 5.634 | 1.493 | 0.569 | 0.404 |
| (previous method) | Standard Deviation | 0.423 | 0.229 | 0.079 | 0.058 |
| Sample 6 | Average | 0.266 | 0.100 | 0.037 | 0.031 |
| (present disclosure | Standard Deviation | 0.114 | 0.040 | 0.016 | 0.015 |

As shown in Table 1, over a field of vision of 0.072 mm by 0.052 mm sample 4 had average roughness (Ra) greater than 30 times the average roughness (Ra) of sample 6. Over the same field of vision, sample 5 had an average roughness (Ra) almost 20 times the average roughness (Ra) of sample 6.

As shown in Table 2, over a field of vision of 0.14 mm by 0.11 mm sample 4 had average roughness (Ra) greater than 15 times the average roughness (Ra) of sample 6. Over the same field of vision, sample 5 had an average roughness (Ra) greater than 13 times the average roughness (Ra) of sample 6.

Figure 18:
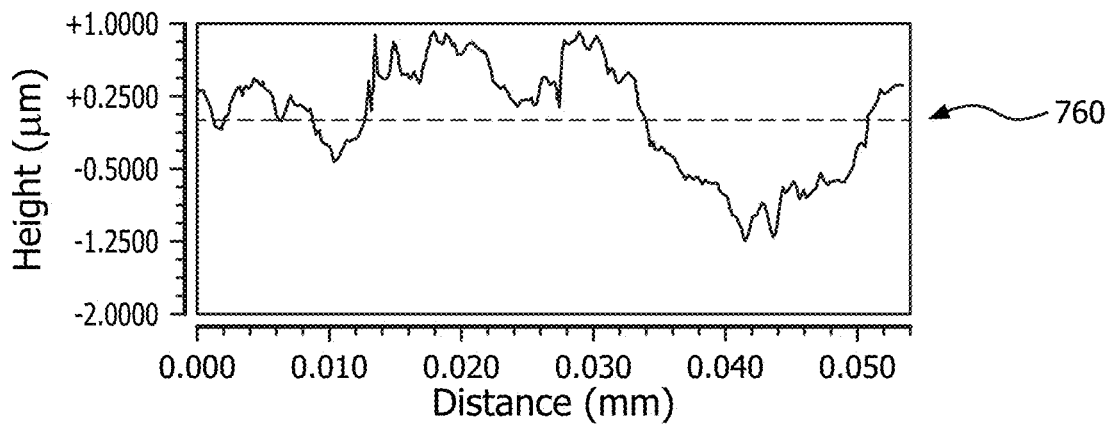
FIG. 18 is a line profile of an inner surface of an inner layer of a coated hollow tube, in accordance with the prior art methods.
Figure 19:
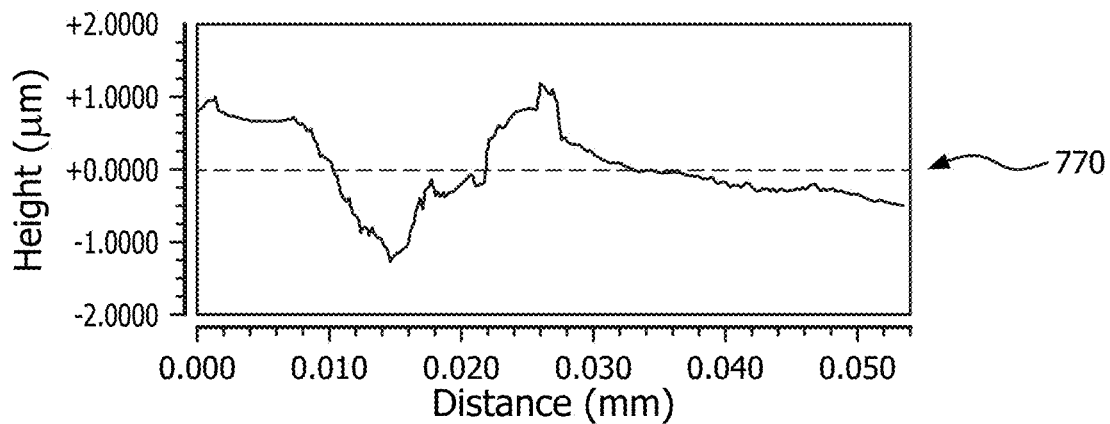
FIG. 19 is a line profile of an inner surface of an inner layer of a coated hollow tube, in accordance with the prior art methods.
Figure 20:
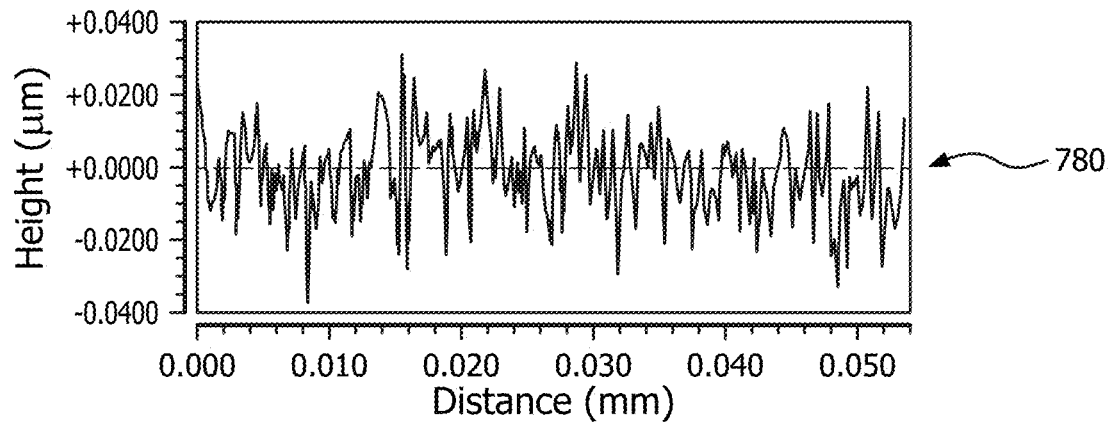
FIG. 20 is a line profile of an inner surface of an inner layer of a coated hollow tube, according to various examples.

FIGS. 18, 19, and 20 are line profiles taken with a field of vision of 0.072 mm by 0.052 mm. FIG. 18 is a line profile of sample 4 (730) described above. FIG. 19 is a line profile of sample 5 (740) described above. FIG. 20 is a line profile of sample 6 (750) described above. As shown in FIG. 20, the inner surface of sample 6 was never higher or lower than 0.0400 μm from a plane fit 780 defined through the surface. In contrast, FIGS. 18 and 19 show that the inner surfaces of samples 4 and 5 had crests of almost 1.00 μm and valleys of over 1.00 μm from a plane fit 760, 770 defined through the surface.

Three roughness measurements of line profiles with a field of vision of 0.072 mm by 0.052 mm (corresponding to setting of 50× objective and 2× camera zoom) were taken of each inner surface of samples 4 (730), 5 (740), and 6 (750); these are shown in Table 3. Three roughness measurements of line profiles with a field of vision of 0.14 mm by 0.11 mm (corresponding to setting of 50× objective and 1× camera zoom) were taken of each inner surface of samples 4 (730), 5 (740), and 6 (750); these are shown in Table 4 The average of the three values of the roughness measurement for each sample and the standard deviation is given in Tables 3 and 4.

TABLE 3

Roughness measurements of line profiles with a field of vision of 0.072 mm by 0.052 mm

| | | PV | H | RMS | Ra |
|---|---|---|---|---|---|
| Sample 4 (previous method) | Average | 2.444 | 1.658 | 0.627 | 0.503 |
| | Standard Deviation | 0.223 | 0.595 | 0.120 | 0.127 |
| Sample 5 (previous method) | Average | 2.946 | 1.130 | 0.554 | 0.363 |
| | Standard Deviation | 0.699 | 0.308 | 0.051 | 0.039 |
| Sample 6 (present disclosure) | Average | 0.078 | 0.039 | 0.013 | 0.011 |
| | Standard Deviation | 0.010 | 0.004 | 0.001 | 0.001 |

TABLE 4

Roughness measurements of line profiles with a field of vision of 0.14 mm by 0.11 mm

| | | PV | H | RMS | Ra |
|---|---|---|---|---|---|
| Sample 4 (previous method) | Average | 2.804 | 1.722 | 0.631 | 0.495 |
| | Standard Deviation | 0.658 | 0.437 | 0.192 | 0.118 |
| Sample 5 (previous method) | Average | 2.493 | 1.417 | 0.476 | 0.375 |
| | Standard Deviation | 0.365 | 0.207 | 0.054 | 0.055 |
| Sample 6 (present disclosure) | Average | 0.043 | 0.025 | 0.009 | 0.007 |
| | Standard Deviation | 0.006 | 0.005 | 0.002 | 0.002 |

As shown in Table 3, a line profile taken over a field of vision of 0.072 mm by 0.052 mm showed that sample 4 had average roughness (Ra) greater than 45 times the average roughness (Ra) of sample 6. Over the same field of vision, sample 5 had an average roughness (Ra) greater than 30 times the average roughness (Ra) of sample 6.

As shown in Table 4, a line profile taken over a field of vision of 0.14 mm by 0.11 mm showed that sample 4 had average roughness (Ra) greater than 70 times the average roughness (Ra) of sample 6. Over the same field of vision, sample 5 had an average roughness (Ra) greater than 53 times the average roughness (Ra) of sample 6.

As previously discussed, the system and methods disclosed herein may provide a coated hollow tube that is free or substantially free of particulate matter within an inner lumen of the coated hollow tube. To measure any particulate matter that may be produced when forming a coated hollow tube using the system and methods disclosed, a particulate sizing and counting test was conducted using two test samples. Particulate matter is defined herein as extraneous, mobile, undissolved substances, other than gas bubbles, present in or on each sample tested.

Test group 1 included three sample tubes having an outer layer and inner layer of medical grade thermoplastic polyurethane (Texin® RxT85A, from Covestro, AG located in Leverkusen, Germany). Each tube had an outer diameter of 0.188 inches (0.478 cm), an inner diameter of 0.088 inches (0.224 cm), and a length of 12 inches (30.48 cm).

Test group 2 included three sample tubes having an outer layer and inner layer of medical grade thermoplastic polyurethane (Texin® RxT85A). Each tube had an outer diameter of 0.188 inches (0.478 cm), an inner diameter of 0.088 inches (0.224 cm), and a length of 20 inches (30.48 cm).

Testing was performed in compliance with US FDA good manufacturing practice (GMP) regulations (21 C.F.R., parts 210, 211 and 820). All testing was performed by Nelson Laboratories, located in Wall, N.J. Testing procedures followed Nelson Laboratories Standard Test Protocol (STP) Number: STP0011, Rev 08. Testing was performed using the HIAC Royco Liquid Particle Counting System (LPC), Model #9703. The LPC detected and sized particles using a light-obscuration sensor. The LPC's sensor was calibrated by the manufacturer using polystyrene latex particles from 2 μm to 10 μm in diameter. The particle count test was conducted by filling each tube with test fluid which was drained and placed in a test cuvette. Light obscuration fluid in the test cuvette was measured to determine particle count. Each tube was filled with test fluid and drained twice, resulting in a first extract and a second extract. The results of each test are contained below.

TABLE 5

Test Group 1 - Particle Count

| Sample Number and Extract | ≤10 μm Particles/Device | ≤25 μm Particles/Device |
|---|---|---|
| Tube 1, First extract | 425 | 10 |
| Tube 1, Second extract | 208 | 8 |
| Tube 2, First extract | 37 | 5 |
| Tube 2, Second extract | 127 | 2 |
| Tube 3, First extract | 37 | 2 |
| Tube 3, Second extract | 135 | 0 |

TABLE 6

Test Group 2 - Particle Count

| Sample Number and Extract | ≤10 μm Particles/Device | ≤25 μm Particles/Device |
|---|---|---|
| Tube 1, First extract | 58 | 3 |
| Tube 1, Second extract | 132 | 22 |
| Tube 2, First extract | 33 | 2 |
| Tube 2, Second extract | 100 | 7 |

TABLE 6-continued

Test Group 2 - Particle Count

| Sample Number and Extract | ≤10 μm Particles/Device | ≤25 μm Particles/Device |
|---|---|---|
| Tube 3, First extract | 42 | 2 |
| Tube 3, Second extract | 42 | 2 |

TABLE 7

Particle Count Acceptance Criteria
Light Obscuration: USP <788> and EP 2.9.19 Requirements:

| Volume | ≥10 μm | ≥25 μm |
|---|---|---|
| Large | ≤25 Particles/mL | ≤3 Particles/mL |
| Small | ≤6,000 Particles/Container | ≤600 Particles/Container |

As shown when comparing the results in Tables 5 and 6 to the acceptance criteria in Table 7, all particle count values are lower than the acceptance limits. It may be noted that for certain tubes, the second extract resulted in a higher particle count than the first extract. Due to the values observed in this test being much lower than the acceptance criteria shown in Table 6, it is believed that this difference may be attributed to the measurement error of the particle counter. For example, as shown in Table 5, coated hollow tubes made with systems and methods according to examples of the present disclosure all had less than 425 particles ≤10 μm in diameter per sample and less than 23 particles≤25 μm in diameter per sample. As shown the particle counts for the samples tested this study are within the USP <788> 1.B (Particulate Matter in Injections) parameters and EP 2.9.19 requirements.

Persons skilled in the art will readily appreciate that various aspects of the present disclosure may be realized by any number of methods and apparatuses configured to perform the intended functions. Stated differently, other methods and apparatuses may be incorporated herein to perform the intended functions. It should also be noted that the accompanying drawing figures referred to herein are not all drawn to scale, but may be exaggerated to illustrate various aspects of the present disclosure, and in that regard, the drawing figures should not be construed as limiting. Finally, although the present disclosure may be described in connection with various principles and beliefs, the present disclosure should not be bound by theory.

What is claimed is:

1. A method of coating a hollow base tube, the method comprising:
passing a hollow base tube into a coating die configured to maintain a chamber pressure outside the hollow base tube that is lower than an internal pressure within an inner lumen of the hollow base tube;
extruding coating material onto the hollow base tube using the coating die to form a coated hollow tube by delivering coating material into the coating die, wherein a vacuum is maintained within the coating die proximate a point of impingement where the coating material is applied to the hollow base tube,
passing the hollow base tube through a first vacuum chamber, wherein the first vacuum chamber is configured to maintain a first pressure within the first vacuum chamber that is lower than an ambient pressure outside the first vacuum chamber; and
passing the hollow tube through a second vacuum chamber that is downstream from the first vacuum chamber, wherein the second vacuum chamber is configured to maintain a second pressure within the second vacuum chamber that is lower than the first pressure, the coating die being in fluid communication with the second vacuum chamber.

2. The method of claim 1, wherein the hollow base tube includes a reinforcing layer.

3. The method of claim 1, wherein the hollow base tube includes a reinforcing layer comprising one or more strands of reinforcing material formed into at least one of a braided, coiled, spiral wound, and helical pattern.

4. The method of claim 1, wherein the hollow base tube has a continuous inner layer defining an inner surface of the hollow base tube.

5. The method of claim 1, further comprising maintaining the internal pressure inside the hollow base tube as the coating material is applied to the hollow base tube.

6. The method of claim 1, wherein maintaining the chamber pressure outside the hollow base tube at a pressure that is lower than the internal pressure within the inner lumen of the hollow base tube provides radial support to the hollow base tube as the hollow base tube passes through the coating die.

7. The method of claim 1, further comprising extruding coating material onto the hollow base tube within the coating die such that the coating material forms a seal between the coating die and an outer surface of the hollow base tube such that the vacuum is applied between the coating material and the outer surface of the hollow base tube during application of the coating material to the hollow base tube.

8. The method of claim 1, further comprising selecting the chamber pressure relative to a wall thickness and a durometer of the hollow base tube such that a dimensional stability of the hollow base tube is maintained.

9. The method of claim 1, further comprising controlling a tension along the hollow base tube to maintain a dimensional stability of the hollow base tube as the coating material is applied to the hollow base tube.

10. The method of claim 1, further comprising controlling the chamber pressure outside the hollow base tube and a tensile force along the hollow base tube such that a dimensional stability of the hollow base tube is maintained as the coating material is applied to the hollow base tube.

11. The method of claim 1, wherein passing the hollow base tube through the first vacuum chamber and passing the hollow base tube through the second vacuum chamber having the second pressure that is lower than an internal pressure within the inner lumen of the hollow base tube provides increased radial strength to the hollow base tube relative to a radial strength of the hollow base tube prior to being passed through the first vacuum chamber.

12. The method of claim 1, wherein the coated hollow tube is characterized by a substantially smooth inner surface at a magnification of 100×.

13. The method of claim 1, wherein the coated hollow tube is characterized by an inner surface having an average surface roughness (Ra) of 0.04 μm or less.

14. The method of claim 1, wherein the coated hollow tube is characterized by an inner surface having an average surface roughness (Ra) of 0.01 μm or less.

15. The method of claim 1, wherein the coated hollow tube is characterized by a count of less than 450 particles over 10 μm in size on a sample having an inner diameter of about 0.2 cm or greater, and a length of about 30 cm or greater.

16. The method of claim 1, wherein the coated hollow tube is characterized by a count of less than 25 particles over 25 μm in size on a sample having an inner diameter of about 0.2 cm or greater, and a length of about 30 cm or greater.

17. The method of claim 1, wherein the hollow base tube is a reinforced tube having an open inner lumen and the coated hollow tube is substantially free of voids between the coating material and the reinforced tube.

18. The method of claim 1, wherein the hollow base tube is a reinforced tube having an open inner lumen and the coated hollow tube is substantially free of voids within the coating material.

* * * * *